United States Patent
Qi et al.

(10) Patent No.: US 11,327,246 B2
(45) Date of Patent: May 10, 2022

(54) OPTICAL FIBER CONNECTOR, PREFABRICATED OPTICAL FIBER, ADAPTER, FIBER TERMINATION BOX, AND OPTICAL FIBER CONNECTION ASSEMBLY

(71) Applicant: Huawei Technologies Co., Ltd., Shenzhen (CN)

(72) Inventors: Biao Qi, Wuhan (CN); Xiupeng Li, Wuhan (CN); Rui Xiong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/819,913

(22) Filed: Mar. 16, 2020

(65) Prior Publication Data

US 2020/0218014 A1 Jul. 9, 2020

Related U.S. Application Data

(63) Continuation of application No. PCT/CN2018/125659, filed on Dec. 29, 2018.

(51) Int. Cl.
*G02B 6/38* (2006.01)

(52) U.S. Cl.
CPC .......... *G02B 6/387* (2013.01); *G02B 6/3825* (2013.01); *G02B 6/3849* (2013.01); *G02B 6/3893* (2013.01)

(58) Field of Classification Search
CPC .. G02B 6/3821; G02B 6/3825; G02B 6/3826; G02B 6/3849; G02B 6/3857; G02B 6/381; G02B 6/387; G02B 6/3873; G02B 6/3879; G02B 6/3887; G02B 6/3891; G02B 6/3897; G02B 3/4476

USPC ...................................................... 385/53–78
See application file for complete search history.

(56) References Cited

U.S. PATENT DOCUMENTS

| | | | |
|---|---|---|---|
| 7,556,437 B2 * | 7/2009 | Droege | G02B 6/3849 385/139 |
| 8,864,389 B2 * | 10/2014 | Lin | G02B 6/3897 385/58 |
| 9,625,658 B1 | 4/2017 | Lin | |
| 2012/0027360 A1 | 2/2012 | Larson et al. | |
| 2012/0033921 A1 | 2/2012 | Haley et al. | |
| 2012/0057830 A1 | 3/2012 | Taira et al. | |
| 2012/0177326 A1 | 7/2012 | Peng et al. | |

(Continued)

FOREIGN PATENT DOCUMENTS

| CN | 201689192 U | 12/2010 |
|---|---|---|
| CN | 101988976 A | 3/2011 |

(Continued)

*Primary Examiner* — Michael P Mooney
(74) *Attorney, Agent, or Firm* — Conley Rose, P.C.

(57) ABSTRACT

An optical fiber connector, comprising a main shaft, a connecting piece, and a lock cap. The main shaft comprises a head end and a tail end that is away from the head end. A through hole extending from the head end to the tail end is disposed in the main shaft. The connecting piece is fixedly connected to the head end and partially accommodated in the through hole. The lock cap includes a sealing portion and a connection portion that is connected to a side of the sealing portion. The sealing portion is rotationally connected to an outer side of the head end. The connection portion is located on a side that is of the head end and that is away from the tail end.

20 Claims, 19 Drawing Sheets

(56) References Cited

U.S. PATENT DOCUMENTS

| | | | |
|---|---|---|---|
| 2015/0212283 A1 | 7/2015 | Jiang et al. | |
| 2015/0260924 A1 | 9/2015 | Huang et al. | |
| 2015/0338583 A1 | 11/2015 | Valencia | |
| 2016/0266326 A1 | 9/2016 | Gniadek | |
| 2016/0327756 A1 | 11/2016 | Raven et al. | |
| 2019/0227244 A1* | 7/2019 | Huang | G02B 6/3891 |
| 2019/0391343 A1 | 12/2019 | Aoshima et al. | |

FOREIGN PATENT DOCUMENTS

| | | |
|---|---|---|
| CN | 202472043 U | 10/2012 |
| CN | 102870023 A | 1/2013 |
| CN | 108459378 A | 8/2018 |
| EP | 0547777 A1 | 11/1992 |
| EP | 0758754 A2 | 2/1997 |
| EP | 3514590 A1 | 7/2019 |
| JP | S5891711 A | 5/1983 |
| JP | H01312517 A | 12/1989 |
| JP | H0451208 A | 2/1992 |
| JP | H06123821 A | 5/1994 |
| JP | 2006146084 A | 6/2006 |
| JP | 2012078791 A | 4/2012 |
| JP | 2015228025 A | 12/2015 |
| JP | 2016197259 A | 11/2016 |
| JP | 2018518718 A | 7/2018 |
| WO | 2017131717 A1 | 8/2017 |
| WO | 2018058508 A1 | 4/2018 |
| WO | 2018142677 A1 | 8/2018 |

* cited by examiner

OPTICAL FIBER CONNECTOR, PREFABRICATED OPTICAL FIBER, ADAPTER, FIBER TERMINATION BOX, AND OPTICAL FIBER CONNECTION ASSEMBLY

CROSS-REFERENCE TO RELATED APPLICATIONS

This application is a continuation application of International Patent Application No. PCT/CN2018/125659, filed on Dec. 29, 2018, the disclosure of which is hereby incorporated by reference in its entirety.

TECHNICAL FIELD

This application relates to an optical fiber connector, a prefabricated optical fiber, an adapter, a fiber termination box, and an optical fiber connection assembly.

BACKGROUND

To simplify operations during drop cable layout of a fiber-to-the-home (FTTH) network, industry insiders use an optical fiber pre-connection product to connect a drop cable to a fiber distribution box and a customer terminal box. Both ends of the drop cable of the optical fiber pre-connection product are provided with prefabricated optical fiber connectors, and the fiber distribution box and the customer terminal box are also provided with corresponding prefabricated fiber adapters. During the drop cable layout, it is only required to insert the optical fiber connectors on both ends of the drop cable into the corresponding fiber adapters on the customer terminal box and on the fiber distribution box respectively.

A conventional optical fiber connector and a conventional fiber adapter are locked to each other using a threaded connection structure between the optical fiber connector and the fiber adapter. Such a connection manner requires the optical fiber connector to rotate for a plurality of turns during locking and detaching, and is complex to operate. In addition, the conventional optical fiber connector and the conventional fiber adapter may not be properly or securely locked through manual operation, resulting in poor reliability of the connection between the optical fiber connector and the fiber adapter.

SUMMARY

Embodiments of this application provide an optical fiber connector, a prefabricated optical fiber to which the optical fiber connector is applied, an adapter, a fiber termination box to which the adapter is applied, and an optical fiber connection assembly. The optical fiber connector and the adapter of the optical fiber connection assembly are easy to assemble and disassemble, and a connection between the optical fiber connector and the adapter is highly reliable.

According to a first aspect, an embodiment of this application provides an optical fiber connector, including a main shaft, a connecting piece, and a lock cap. The main shaft includes a head end and a tail end that is away from the head end. A through hole extending from the head end to the tail end is disposed in the main shaft. The connecting piece is fixedly connected to the head end and partially accommodated in the through hole. The lock cap includes a sealing portion and a connection portion that is connected to a side of the sealing portion. The sealing portion is rotationally connected to an outer side of the head end. The connection portion is located on a side that is of the head end and that is away from the tail end. The connection portion is configured to partially accommodate an adapter when the connecting piece is inserted into the adapter. A lock protrusion is disposed on an inner side of the connection portion. The lock protrusion is configured to be snap-fitted to a lock slot of the adapter when the lock cap is rotated by a first angle relative to the adapter. The first angle is less than or equal to 90 degrees (°).

In this embodiment, the lock protrusion is disposed on the lock cap of the optical fiber connector, and the lock protrusion and the lock slot can be snap-fitted to each other after the lock protrusion and the lock slot are rotated relative to each other. Therefore, the optical fiber connector can be connected to the corresponding adapter in a rotary snap-fit lock manner. Assembly and disassembly of the optical fiber sub-assembly and the adapter are simple and time-saving, the connected optical fiber connector and adapter are highly stable and secure, and a signal transmission process between the optical fiber connector and the adapter is reliable.

In an optional embodiment, the main shaft further includes a transition section located between the head end and the tail end. A first limiting surface facing the tail end is disposed on the transition section. The lock cap further includes a limiting portion connected to a side that is of the sealing portion and that is away from the connection portion. A second limiting surface facing the sealing portion is disposed on the limiting portion. The optical fiber connector further includes an elastic part. The elastic part is located between the transition section and the sealing portion, and two ends of the elastic part abut against the first limiting surface and the second limiting surface respectively.

In this embodiment, the elastic part is disposed such that the first limiting surface and the second limiting surface tend to move away from each other, and the lock cap tends to move toward the tail end of the main shaft. Therefore, when the lock cap is connected to an adapter, the lock protrusion can be stably snap-fitted to the lock slot of the adapter, and the connecting piece and the adapter are fastened to each other such that a connection relationship between the optical fiber connector and the adapter is reliable, thereby achieving good shockproof and anti-looseness effects.

In an optional embodiment, the connecting piece includes a connection base and one or more connection terminals. One end of the connection base is inserted into the through hole. The one or more connection terminals are fastened to the other end of the connection base.

In this embodiment, the one or more connection terminals may be mounted on the connection base together such that the optical fiber connector may be applicable to more types of prefabricated optical fibers with different requirements, and applicability of the optical fiber connector is relatively good. When a plurality of connection terminals are mounted on the connection base together, a port density of the optical fiber connector is relatively high.

In an optional embodiment, the connection terminal includes a protective housing and a ferrule mounted in the protective housing. A top end face that is of the protective housing and that is away from the connection base protrudes relative to a top end face that is of the ferrule and that is away from the connection base. In this case, the top end face of the protective housing can protect the ferrule. When the optical fiber connector is connected to an adapter, the top end face of the protective housing is, earlier than the ferrule, inserted into the adapter, to prevent the ferrule from damage due to an inaccurate action of an installation engineer in a blind-mate scenario, thereby lowering a requirement for inserting the optical fiber connector and extending a service life of the optical fiber connector.

In an optional embodiment, the connection base includes a fastening portion and one or more mounting portions located on a side of the fastening portion. The one or more mounting portions are partially inserted into the one or more connection terminals in a one-to-one correspondence manner. The fastening portion and the one or more mounting portions are integrally formed. That is, the connection base is integrally formed. In this case, the one or more connection terminals are fastened to the connection base through insertion.

In this embodiment, the mounting portion is inserted into the connection terminal such that the optical fiber connector implements fastening of the connection terminal to the connection base. Therefore, the connection base can have an integrally formed structure, thereby reducing manufacturing costs and manufacturing difficulty of the connection base. In addition, the connection terminal is fastened to the connection base through insertion. Such an assembly process is more convenient and less difficult.

In an optional embodiment, the connection terminal includes a protective housing and a ferrule mounted in the protective housing. A limiting hole is disposed on the protective housing. A limiting protrusion is disposed on the mounting portion. The mounting portion is partially inserted into the corresponding protective housing, and the limiting protrusion is partially or completely clamped in the limiting hole.

In this embodiment, the connection terminal and the connection base are fastened to each other through a snap-fit connection between the limiting hole and the limiting protrusion such that the connection terminal can be fastened to the connection base through insertion. This connection manner between the connection terminal and the connection base is easy to implement and stable.

In an optional embodiment, an inner surface of the protective housing includes a first locating surface facing the fastening portion. An outer sidewall of the ferrule includes a second locating surface facing away from the fastening portion. The connecting piece further includes an elastic connection part. The elastic connection part is compressed between the ferrule and the mounting portion. An elastic force of the elastic connection part firmly presses the second locating surface against the first locating surface. In this case, the ferrule is fastened relative to the protective housing, and the ferrule is not swaying. This helps ensure connection reliability between the optical fiber connector and an adapter.

In an optional embodiment, an outer diameter of the sealing portion is less than an outer diameter of the connection portion. In this case, an outer circumferential surface of the lock cap has a step-shaped structure, and the lock cap substantially has a step-shaped cylinder structure, thereby meeting a requirement for accommodation capacity of the lock cap (the lock cap is required to accommodate most components of the optical fiber connector), and minimizing a volume of the lock cap. Therefore, the optical fiber connector is more compact, and a risk of interference between the optical fiber connector and an adjacent structure during installation is reduced.

In an optional embodiment, the optical fiber connector further includes a first sealing ring. The first sealing ring is located in the connection portion. The first sealing ring is configured to be compressed between the connection portion and an adapter. In this case, the first sealing ring is configured to seal a connection between the lock cap and another component, to achieve waterproof and dustproof effects such that the optical fiber connector has a longer service life and higher reliability.

In an optional embodiment, a sealing groove wrapping around the through hole is disposed on an outer circumferential side of the main shaft. The optical fiber connector further includes a second sealing ring. The second sealing ring is compressed between a groove wall of the sealing groove and an inner side surface of the sealing portion. In this case, the second sealing ring can prevent external moisture, dust, or the like from entering the lock cap through a gap between the lock cap and the main shaft, thereby improving reliability of the optical fiber connector.

In an optional embodiment, the optical fiber connector further includes a sealing sleeve. One end of the sealing sleeve is sleeved on an outer side of the tail end in a sealing manner. The other end of the sealing sleeve is configured to allow insertion of an optical cable and be connected to the optical cable in a sealing manner. The sealing sleeve is configured to implement a sealed connection between the optical cable and the main shaft, to improve reliability of the optical fiber connector and extend a service life of the optical fiber connector.

In an optional embodiment, the tail end includes a rubber portion close to the head end and a metal portion that is away from the head end. The metal portion is partially located in the rubber portion and is fixedly connected to the rubber portion. The metal portion and the rubber portion may be integrally formed through in-mold decoration. The metal portion and the rubber portion may alternatively form an integrated structure through assembly (for example, a threaded connection or a snap-fit connection).

The sealing sleeve is connected to a part of the metal portion and a part of the rubber portion in a sealing manner. In this case, for the sealing sleeve, the end connected to the tail end of the main shaft is connected to both a part of the metal portion and a part of the rubber portion in a sealing manner. In this case, a connection relationship between the sealing sleeve and the tail end of the main shaft is more stable and reliable.

In an optional embodiment, the optical fiber connector further includes a metal crimp ring. The metal crimp ring is located in the sealing sleeve. One end of the metal crimp ring is sleeved on an outer side of the metal portion. The other end of the metal crimp ring is configured to be sleeved on an outer side of the optical cable, and the end of the metal crimp ring is capable of firmly pressing an aramid yarn of the optical cable against the metal portion.

In this embodiment, the metal crimp ring firmly presses the aramid yarn against the metal portion, thereby improving connection strength between the optical cable and the main shaft, and improving tensile strength of the optical fiber connector.

In an optional embodiment, the optical fiber connector further includes a dust cap and a lanyard. One end of the lanyard is sleeved on an outer side of the main shaft. The other end of the lanyard is connected to the dust cap. A dustproof lock slot is disposed on an end of the dust cap. The end of the dust cap is capable of extending into the connection portion, and the dustproof lock slot is snap-fitted to the lock protrusion.

In this embodiment, when the optical fiber connector is not connected to an adapter, the dust cap may be mounted on one end that is of the lock cap and that is away from a tail ferrule, to be sleeved on an outer side of the connecting piece, thereby achieving waterproof and dustproof effects and protecting the connecting piece. When the optical fiber connector is to be connected to an adapter, the dust cap is detached from the lock cap such that the connecting piece is exposed and can be connected to the adapter through insertion. However, the dust cap is still connected to another structure of the optical fiber connector using the lanyard, to prevent the dust cap from getting lost. The dust cap can be mounted to the lock cap again after the optical fiber connector is detached from the adapter such that the optical fiber connector allows frequent insertion and detachment, thereby improving reliability of the optical fiber connector.

According to a second aspect, an embodiment of this application further provides a prefabricated optical fiber. The prefabricated optical fiber includes an optical cable and the optical fiber connector according to any one of the foregoing embodiments. The optical cable extends into the through hole and is connected to the connecting piece.

In this embodiment, the optical fiber connector of the prefabricated optical fiber can be connected to an adapter of a fiber termination box in a rotary snap-fit lock manner such that assembly is less difficult and time-saving. Therefore, the prefabricated optical fiber can be better applied to an FTTH network. This helps simplify installation during cable layout of an FTTH network and shorten onsite work duration.

According to a third aspect, an embodiment of this application further provides an adapter. The adapter includes an adapter body. The adapter body includes an input end and an output end that is away from the input end. A penetration hole extending from the input end to the output end is disposed in the adapter body. The penetration hole is configured to accommodate a part of a connecting piece of an optical fiber connector when the input end is inserted into a lock cap of the optical fiber connector. A lock slot is disposed on an outer sidewall of the input end. The lock slot extends a second angle in a circumferential direction of the input end. The second angle is less than or equal to 90°. The lock slot is configured to accommodate a lock protrusion on an inner side of the lock cap and be snap-fitted to the lock protrusion.

In this embodiment, the lock slot is disposed on the adapter and the lock slot can be snap-fitted to the lock protrusion on the lock cap of the optical fiber connector. Therefore, the adapter can be connected to the optical fiber connector in a rotary snap-fit lock manner. An angle of rotation of the lock cap of the optical fiber connector relative to the adapter body is limited by a structure size of the lock slot such that the angle of rotation of the lock cap relative to the adapter body is less than or equal to the second angle. The second angle is less than or equal to 90°. Therefore, assembly and disassembly of the adapter and the optical fiber connector are simple, less difficult, and time-saving, and a connection relationship between the connected adapter and optical fiber connector is stable, reliable, and secure.

In an optional embodiment, the adapter further includes a protective cap and a connection lanyard. One end of the connection lanyard is sleeved on an outer side of the adapter body. The other end of the connection lanyard is connected to the protective cap. A protective lock protrusion is disposed on an inner side of an end of the protective cap. The end of the protective cap can be sleeved on an outer sidewall of the input end, and the protective lock protrusion is snap-fitted to the lock slot.

In this embodiment, the protective cap is connected to the adapter body in a rotary snap-fit lock manner. A structure of the lock slot is designed such that an angle of rotation of the protective cap relative to the adapter body is less than or equal to a second angle, where the second angle is less than or equal to 90°. Therefore, assembly and disassembly of the protective cap are simple and time-saving, and a snap-fit connection between the protective cap and the adapter body is highly stable and secure. In this way, the protective cap can effectively protect the adapter body from water, dust, and the like, thereby helping improve reliability of the adapter. The protective cap is connected to the adapter body using the connection lanyard such that the protective cap is difficult to be detached, thereby improving the reliability of the adapter.

According to a fourth aspect, an embodiment of this application further provides a fiber termination box. The fiber termination box includes a box body and the adapter according to any one of the foregoing embodiments, where the adapter is mounted on the box body.

In this embodiment, the adapter of the fiber termination box can be connected to an optical fiber connector in a rotary snap-fit lock manner such that assembly of the adapter and the optical fiber connector is less difficult and time-saving. Therefore, the fiber termination box can be better connected to a prefabricated optical cable that has the optical fiber connector. This helps simplify installation during cable layout of an FTTH network and shorten onsite work duration.

According to a fifth aspect, an embodiment of this application further provides an optical fiber connection assembly. The optical fiber connection assembly includes an optical fiber connector and an adapter. The optical fiber connection assembly may be applied, in an FTTH network, to a connection between a fiber distribution box and a prefabricated optical fiber, and a connection between a prefabricated optical fiber and a customer terminal box.

The optical fiber connector includes a main shaft, a connecting piece, and a lock cap. The main shaft includes a head end and a tail end that is away from the head end. A through hole extending from the head end to the tail end is disposed in the main shaft. The connecting piece is fixedly connected to the head end and partially accommodated in the through hole. The lock cap includes a sealing portion and a connection portion that is connected to a side of the sealing portion. The sealing portion is rotationally connected to an outer side of the head end. The connection portion is located on a side that is of the head end and that is away from the tail end. A lock protrusion is disposed on an inner side of the connection portion.

A body of the adapter includes an input end and an output end that is away from the input end. A penetration hole extending from the input end to the output end is disposed in the adapter body. A lock slot is disposed on an outer sidewall of the input end. The lock slot extends a second angle in a circumferential direction of the input end. The second angle is less than or equal to 90°.

When the connecting piece is partially inserted into the penetration hole, the connection portion accommodates a part of the input end and the lock protrusion is located in the lock slot. The lock protrusion is snap-fitted to the lock slot when the lock cap is rotated by a first angle relative to the adapter body. The first angle is less than or equal to the second angle.

In this embodiment, the lock protrusion is disposed on the lock cap of the optical fiber connector, and the lock protrusion and the lock slot can be snap-fitted to each other after the lock protrusion and the lock slot are rotated relative to each other. Therefore, the optical fiber connector can be connected to the adapter in a rotary snap-fit lock manner. An angle of rotation of the lock cap of the optical fiber connector relative to the adapter body is limited by a structure size of the lock slot such that the first angle of rotation of the lock cap relative to the adapter body is less than or equal to the second angle. The second angle is less than or equal to 90°. Therefore, the optical fiber connector and the adapter are simple and time-saving, the connected optical fiber connector and adapter are stably and securely connected, and a signal transmission process between the optical fiber connector and the adapter is reliable.

In an optional embodiment, the main shaft further includes a transition section located between the head end and the tail end. A first limiting surface facing the tail end is disposed on the transition section. The lock cap further includes a limiting portion connected to a side that is of the sealing portion and that is away from the connection portion. A second limiting surface facing the sealing portion is disposed on the limiting portion. The optical fiber connector further includes an elastic part. The elastic part is located between the transition section and the sealing portion, and two ends of the elastic part abut against the first limiting surface and the second limiting surface respectively.

In this embodiment, the elastic part is disposed on the optical fiber connector such that the first limiting surface and the second limiting surface tend to move away from each other, and the lock cap tends to move toward the tail end of the main shaft. Therefore, when the lock cap is connected to an adapter, the lock protrusion can be stably snap-fitted to the lock slot of the adapter, and the connecting piece and the adapter are fastened to each other such that a connection relationship between the optical fiber connector and the adapter is reliable, thereby achieving good shockproof and anti-looseness effects.

In an optional embodiment, the connecting piece includes a connection base and one or more connection terminals. One end of the connection base is inserted into the through hole. One end of the one or more connection terminals is fastened to the other end of the connection base. The other end of the one or more connection terminals is inserted into the penetration hole.

In this embodiment, the one or more connection terminals may be mounted on the connection base together such that the optical fiber connector may be applicable to more types of prefabricated optical fibers with different requirements, and applicability of the optical fiber connector is relatively good. When a plurality of connection terminals are mounted on the connection base together, a port density of the optical fiber connector is relatively high.

No conventional elastic arm is disposed on the connection terminal of the optical fiber connector in this embodiment. A lock requirement between the optical fiber connector and the adapter is met using a rotary snap-fit lock structure such that a conventional two-step assembly/disassembly process (elastic arm assembly/disassembly and protective cover assembly/disassembly) is simplified into a one-step assembly/disassembly process, thereby further reducing difficulty of and a time for assembly and disassembly of the optical fiber connector and the adapter. In addition, no elastic arm structure is disposed on the connection terminal such that a volume of the connection terminal is reduced. Therefore, a port density can be increased without increasing a volume of the optical fiber connector.

In an optional embodiment, the connection terminal includes a protective housing and a ferrule mounted in the protective housing. A top end face that is of the protective housing and that is away from the connection base protrudes relative to a top end face that is of the ferrule and that is away from the connection base. In this case, the top end face of the protective housing can protect the ferrule. When the optical fiber connector is connected to an adapter, the top end face of the protective housing is, earlier than the ferrule, inserted into the adapter, to prevent the ferrule from damage due to an inaccurate action of an installation engineer in a blind-mate scenario, thereby lowering a requirement for inserting the optical fiber connector and extending a service life of the optical fiber connector.

In an optional embodiment, the connection base includes a fastening portion and one or more mounting portions located on a side of the fastening portion. The one or more mounting portions are partially inserted into the one or more connection terminals in a one-to-one correspondence manner. The fastening portion and the one or more mounting portions are integrally formed. That is, the connection base is integrally formed. In this case, the one or more connection terminals are fastened to the connection base through insertion.

In this embodiment, the mounting portion is inserted into the connection terminal such that the optical fiber connector implements fastening of the connection terminal to the connection base. Therefore, the connection base can have an integrally formed structure, thereby reducing manufacturing costs and manufacturing difficulty of the connection base. In addition, the connection terminal is fastened to the connection base through insertion. Such an assembly process is more convenient and less difficult.

In an optional embodiment, the connection terminal includes a protective housing and a ferrule mounted in the protective housing. A limiting hole is disposed on the protective housing. A limiting protrusion is disposed on the mounting portion. The mounting portion is partially inserted into the corresponding protective housing, and the limiting protrusion is partially or completely clamped in the limiting hole.

In this embodiment, the connection terminal and the connection base are fastened to each other through a snap-fit connection between the limiting hole and the limiting protrusion such that the connection terminal can be fastened to the connection base through insertion. This connection manner between the connection terminal and the connection base is easy to implement and stable.

In an optional embodiment, an inner surface of the protective housing includes a first locating surface facing the fastening portion. An outer sidewall of the ferrule includes a second locating surface facing away from the fastening portion. The connecting piece further includes an elastic connection part. The elastic connection part is compressed between the ferrule and the mounting portion. An elastic force of the elastic connection part firmly presses the second locating surface against the first locating surface. In this case, the ferrule is fastened relative to the protective housing, and the ferrule is not swaying. This helps ensure connection reliability between the optical fiber connector and an adapter.

In an optional embodiment, an outer diameter of the sealing portion is less than an outer diameter of the connection portion. In this case, an outer circumferential surface of the lock cap has a step-shaped structure, and the lock cap substantially has a step-shaped cylinder structure, thereby meeting a requirement for accommodation capacity of the lock cap (the lock cap is required to accommodate most components of the optical fiber connector), and minimizing a volume of the lock cap. Therefore, the optical fiber connector is more compact, and a risk of interference between the optical fiber connector and an adjacent structure during installation is reduced.

In an optional embodiment, the optical fiber connector further includes a first sealing ring. The first sealing ring is located in the connection portion. The first sealing ring is compressed between the connection portion and an adapter. In this case, the first sealing ring is configured to seal a connection between the lock cap and another component, to achieve waterproof and dustproof effects such that the optical fiber connector has a longer service life and higher reliability.

In an optional embodiment, a sealing groove wrapping around the through hole is disposed on an outer circumferential side of the main shaft. The optical fiber connector further includes a second sealing ring. The second sealing ring is compressed between a groove wall of the sealing groove and an inner side surface of the sealing portion. In this case, the second sealing ring can prevent external moisture, dust, or the like from entering the lock cap through a gap between the lock cap and the main shaft, thereby improving reliability of the optical fiber connector.

In an optional embodiment, the optical fiber connector further includes a sealing sleeve. One end of the sealing sleeve is sleeved on an outer side of the tail end in a sealing manner. The other end of the sealing sleeve is configured to allow insertion of an optical cable and be connected to the optical cable in a sealing manner. The sealing sleeve is configured to implement a sealed connection between the optical cable and the main shaft, to improve reliability of the optical fiber connector and extend a service life of the optical fiber connector.

In an optional embodiment, the tail end includes a rubber portion close to the head end and a metal portion that is away from the head end. The metal portion is partially located in the rubber portion and is fixedly connected to the rubber portion. The metal portion and the rubber portion may be integrally formed through in-mold decoration. The metal portion and the rubber portion may alternatively form an integrated structure through assembly (for example, a threaded connection or a snap-fit connection). In this case, for the sealing sleeve, the end connected to the tail end of the main shaft is connected to both a part of the metal portion and a part of the rubber portion in a sealing manner.

The sealing sleeve is connected to a part of the metal portion and a part of the rubber portion in a sealing manner. In this case, a connection relationship between the sealing sleeve and the tail end of the main shaft is more stable and reliable.

In an optional embodiment, the optical fiber connector further includes a metal crimp ring. The metal crimp ring is located in the sealing sleeve. One end of the metal crimp ring is sleeved on an outer side of the metal portion. The other end of the metal crimp ring is configured to be sleeved on an outer side of the optical cable, and the end of the metal crimp ring is capable of firmly pressing an aramid yarn of the optical cable against the metal portion.

In this embodiment, the metal crimp ring firmly presses the aramid yarn against the metal portion, thereby improving connection strength between the optical cable and the main shaft, and improving tensile strength of the optical fiber connector.

DESCRIPTION OF EMBODIMENTS

The following describes the embodiments of this application with reference to the accompanying drawings in the embodiments of this application.

Figure 1:
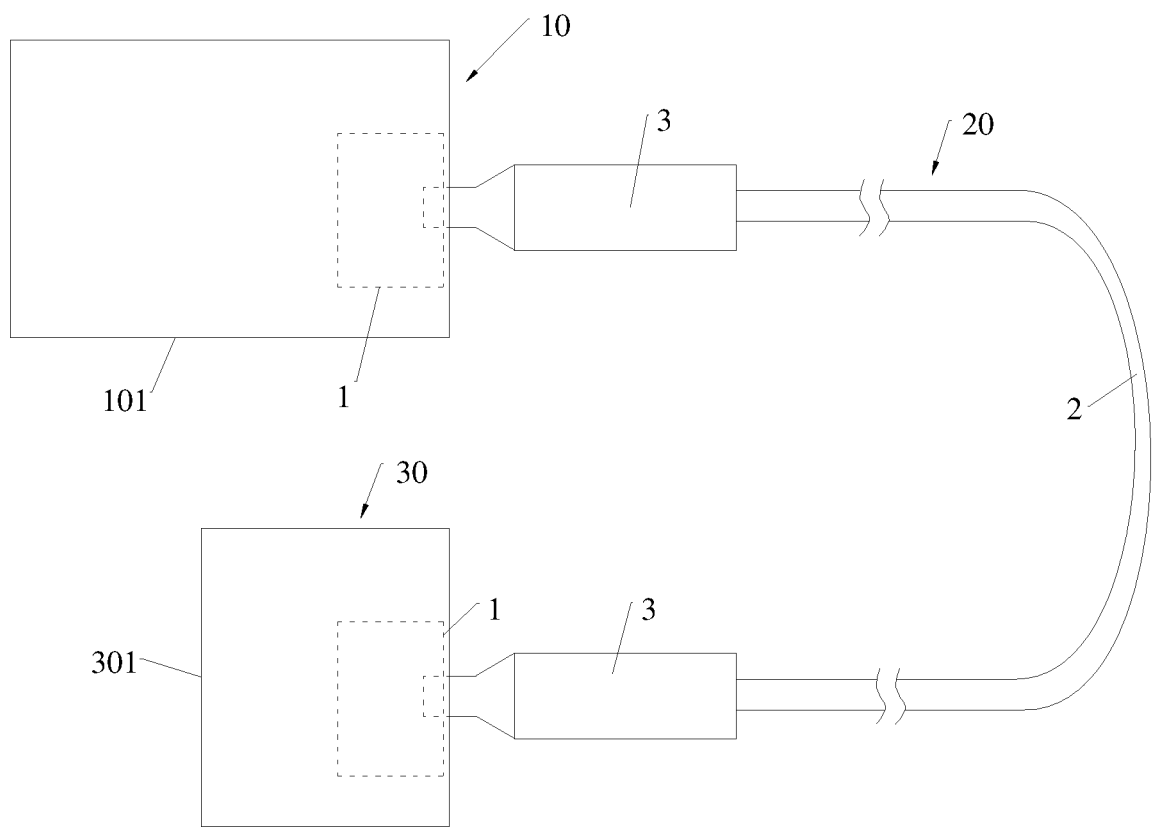
FIG. 1 is a schematic diagram of a structure of an FTTH network according to an embodiment of this application.

FIG. 1 is a schematic diagram of a structure of an FTTH network 100 according to an embodiment of this application.

The FTTH network 100 includes a fiber distribution box 10, a prefabricated optical fiber 20, and a customer terminal box 30. The fiber distribution box 10 and the customer terminal box 30 are both fiber termination boxes. The fiber distribution box 10 (also referred to as a fiber access terminal) is an interface device used outdoors, in a building passage, or indoors to connect a feeder optical cable and a distribution optical cable (hereinafter referred to as an optical cable). The fiber distribution box 10 includes a box body 101 and an adapter 1 (also referred to as a fiber adapter) mounted on the box body 101. The fiber distribution box 10 can be connected to a plurality of customer terminal boxes 30 using a plurality of prefabricated optical fibers 20. This embodiment shown in FIG. 1 illustrates one prefabricated optical fiber 20 and one customer terminal box 30. The prefabricated optical fiber 20 includes an optical cable 2 and optical fiber connectors 3. One optical fiber connector 3 is mounted on each end of the optical cable 2. The customer terminal box 30 includes a box body 301 and an adapter 1 mounted on the box body 301. The two optical fiber connectors 3 of the prefabricated optical fiber 20 are connected to the adapter 1 of the fiber distribution box 10 and the adapter 1 of the customer terminal box 30 respectively.

In this embodiment, the prefabricated optical fiber 20 is used in the FTTH network 100. During cable layout of the prefabricated optical fiber 20, it is only required to insert the two optical fiber connectors 3 of the prefabricated optical fiber 20 into the adapter 1 of the fiber distribution box 10 and the adapter 1 of the customer terminal box 30 respectively such that an installation process is completed. This greatly simplifies installation and shortens onsite work duration.

Figure 2:
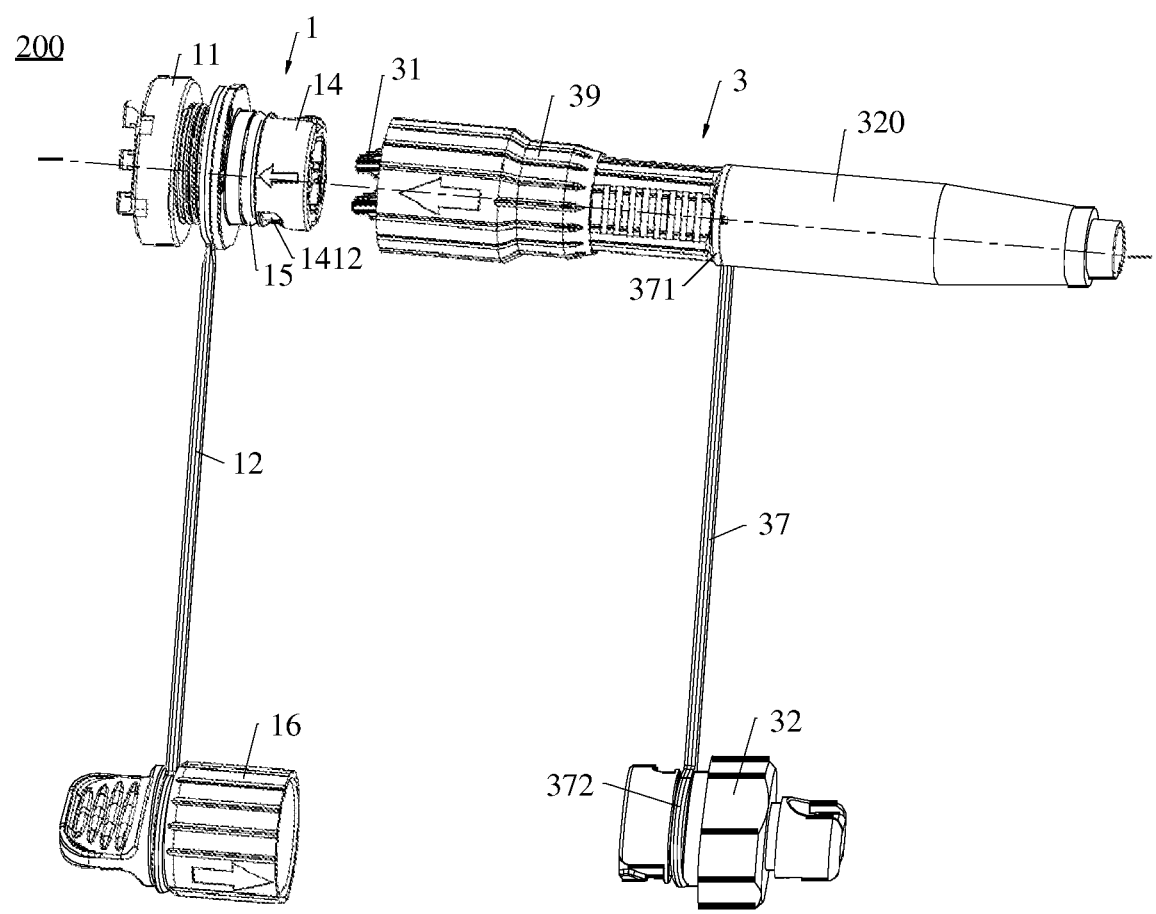
FIG. 2 is a schematic diagram of a structure of an optical fiber connection assembly according to an embodiment of this application.

Referring to FIG. 1 and FIG. 2, FIG. 2 is a schematic diagram of a structure of an optical fiber connection assembly 200 according to an embodiment of this application.

The optical fiber connection assembly 200 includes the optical fiber connector 3 and the adapter 1. A connection between the optical fiber connector 3 and the adapter 1 is a detachable connection. The optical fiber connection assembly 200 may be applied, in the FTTH network 100, to a connection between the fiber distribution box 10 and the prefabricated optical fiber 20, and a connection between the prefabricated optical fiber 20 and the customer terminal box 30. A connecting piece 31 is disposed on one end of the optical fiber connector 3. The optical cable 2 is inserted into the optical fiber connector 3 from the other end of the optical fiber connector 3 and is connected to the connecting piece 31. When the connecting piece 31 is inserted into the adapter 1, an optical signal can be transmitted between the adapter 1 and the optical cable 2.

Figure 3:
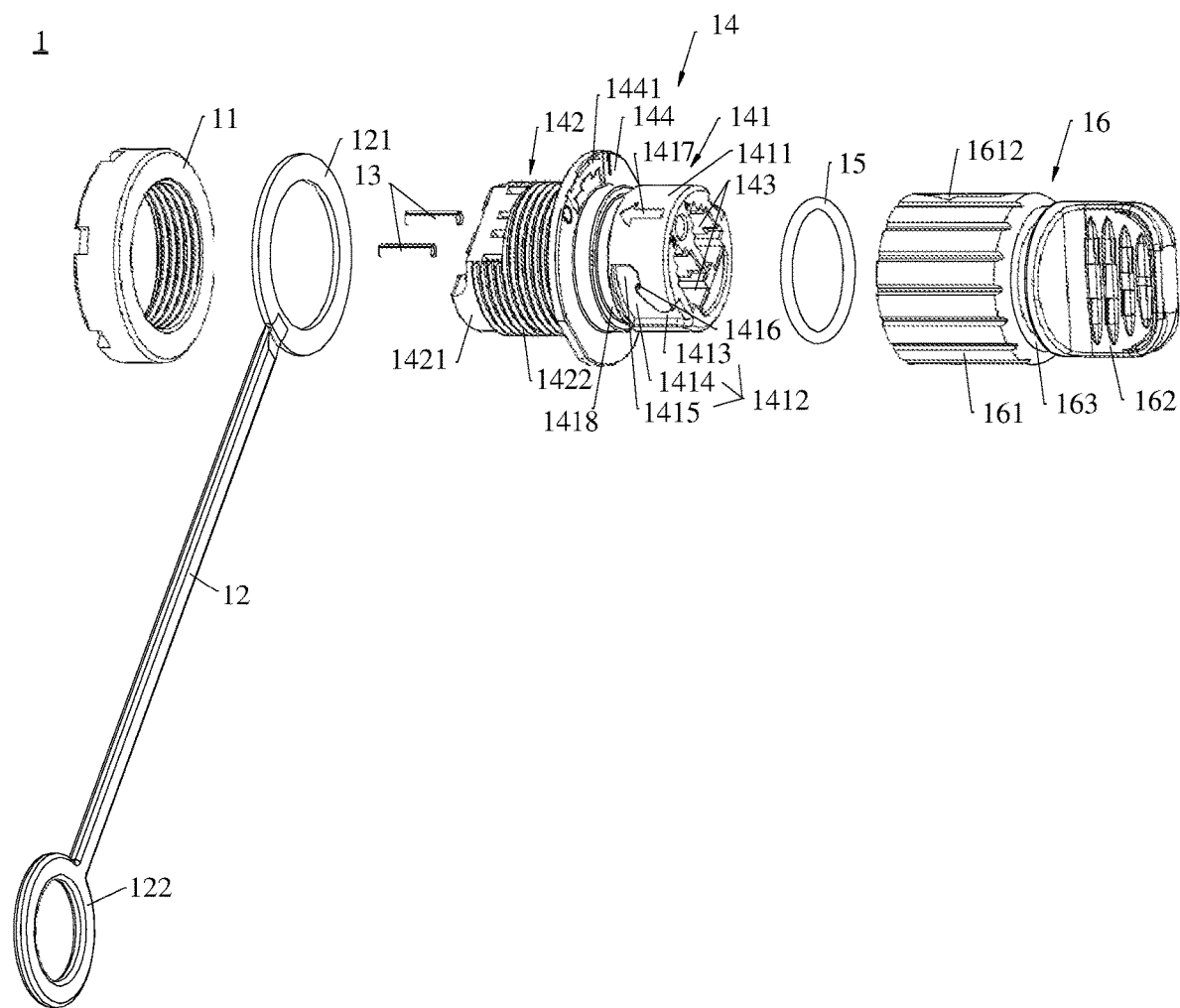
FIG. 3 is a schematic exploded-view diagram of an adapter shown in FIG. 2.

Referring to FIG. 2 and FIG. 3, FIG. 3 is a schematic exploded-view diagram of the adapter 1 shown in FIG. 2.

The adapter 1 includes a lock nut 11, a connection lanyard 12, a ceramic sleeve 13, an adapter body 14, a sealing ring 15, and a protective cap 16.

The adapter body 14 includes an input end 141 and an output end 142 that is away from the input end 141. A penetration hole 143 extending from the input end 141 to the output end 142 is disposed in the adapter body 14. An optical signal can be input from the input end 141 of the adapter body 14 and output from the output end 142 through the penetration hole 143. When the adapter 1 is connected to the optical fiber connector 3, the penetration hole 143 accommodates a part of the connecting piece 31 of the optical fiber connector 3. A shape of the penetration hole 143 is adapted to a shape of the connecting piece 31 accommodated by the penetration hole 143. There may be one or more penetration holes 143. When there are a plurality of penetration holes 143, the plurality of penetration holes 143 are disposed apart from each other. The ceramic sleeve 13 is disposed in each penetration hole 143. The ceramic sleeve 13 is configured to abut against a part of the connecting piece 31 of the optical fiber connector 3 to transmit an optical signal.

Optionally, a lock slot 1412 is disposed on an outer sidewall 1411 of the input end 141. The lock slot 1412 extends a second angle in a circumferential direction of the input end 141, and the second angle is less than or equal to 90°. The outer sidewall 1411 of the input end 141 is a cylindrical surface. The circumferential direction of the input end 141 is a direction perpendicular to and around a central axis of the outer sidewall 1411 of the input end 141. The second angle is a central angle of the lock slot 1412. The second angle may be an angle from 30° to 90°, such as 30°, 45°, 60°, 75°, or 90°. The lock slot 1412 includes a slide-in area 1413, a slide area 1414, and a snap-fit area 1415 that are sequentially connected. The slide area 1414 and the snap-fit area 1415 extend in the circumferential direction of the input end 141. The slide-in area 1413 connects the slide area 1414 to an end face of the input end 141. A snap-fit surface 1416 facing away from the slide-in area 1413 is disposed on the snap-fit area 1415. For example, a direction from the slide area 1414 to the snap-fit area 1415 is a slide-in direction, and an orientation of the snap-fit surface 1416 is opposite to the slide-in direction.

Further, there may be one, two, three or more than three lock slots 1412. This embodiment is described using an example in which there are two lock slots 1412. The two lock slots 1412 are disposed facing away from each other. In addition, the two lock slots 1412 are centrosymmetrically distributed. In an embodiment, when rotated by 180° around the central axis of the outer sidewall 1411 of the input end 141, one lock slot 1412 overlaps the other lock slot 1412. A quantity of the lock slots 1412 may be designed based on the second angle, provided that a plurality of lock slots 1412 are designed to be spaced apart from each other. For example, when the second angle is less than 60°, there may be three lock slots 1412.

Optionally, the adapter body 14 further includes a stop flange 144 located between the input end 141 and the output end 142. An alignment arrow mark 1441 is disposed on a side that is of the stop flange 144 and that faces the input end 141. The alignment arrow mark 1441 is configured to indicate a state of connection/disconnection between another component and the adapter body 14.

Optionally, a threaded connection portion 1422 is disposed on an outer sidewall 1421 of the output end 142. The lock nut 11 is screwed to the threaded connection portion 1422. The lock nut 11 is configured to be connected to a box body of a fiber termination box (refer to 101 or 301 in FIG. 1). In another embodiment, the lock nut 11 may alternatively be a connection component configured to implement another connection manner, and the threaded connection portion 1422 is another structure corresponding to the connection component. The other connection manner includes but is not limited to a snap-fit connection, a mortise and tenon connection, an interference connection, or an elastic connection.

Figure 4:
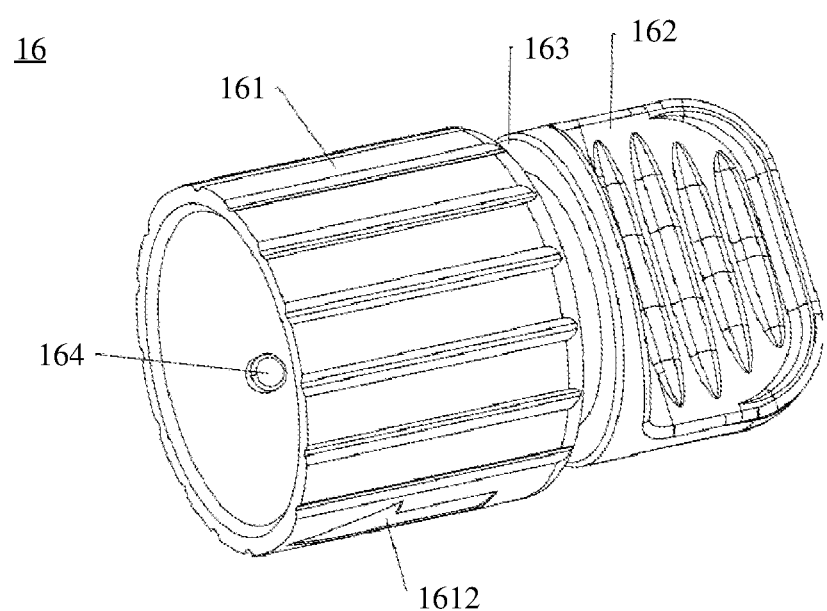
FIG. 4 is a schematic diagram of a structure of a protective cap shown in FIG. 3.

Referring to FIG. 3 and FIG. 4, FIG. 4 is a schematic diagram of a structure of the protective cap 16 shown in FIG. 3.

Optionally, one end 121 of the connection lanyard 12 is sleeved on an outer side of the adapter body 14, and the other end 122 of the connection lanyard 12 is connected to the protective cap 16. In an embodiment, the end 121 of the connection lanyard 12 is sleeved on an outer side of the output end 142, and is located between the stop flange 144 and the lock nut 11. The protective cap 16 includes a connection cap portion 161 and a holding part 322. A top of the connection cap portion 161 is open. The holding part 162 is located on a bottom of the connection cap portion 161. A connection groove 163 is disposed between the connection cap portion 161 and the holding part 162. The connection groove 163 is a continuous annular groove. The end 122 that is of the connection lanyard 12 and that is away from the adapter body 14 is located in the connection groove 163, to connect the protective cap 16.

Optionally, a protective lock protrusion 164 is disposed on an inner side of an end of the protective cap 16. The end of the protective cap 16 can be sleeved on an outer sidewall of the input end 141, and the protective lock protrusion 164 is snap-fitted to the lock slot 1412. In an embodiment, the protective lock protrusion 164 is disposed on an inner side of the connection cap portion 161. When the protective cap 16 is connected to the adapter body 14, the connection cap portion 161 is sleeved on the outer sidewall of the input end 141, that is, the input end 141 is inserted into the connection cap portion 161. The protective lock protrusion 164 slides from the slide-in area 1413 to the lock slot 1412. When the protective cap 16 is rotated relative to the adapter body 14, the protective lock protrusion 164 slides through the slide area 1414 to the snap-fit area 1415, and then is snap-fitted to the snap-fit surface 1416 of the snap-fit area 1415. A snap-fit matching surface matching the snap-fit surface 1416 may be further disposed on the protective lock protrusion 164, to improve snap-fit stability between the protective lock protrusion 164 and the adapter body 14.

In this embodiment, the protective cap 16 is connected to the adapter body 14 in a rotary snap-fit lock manner. A structure of the lock slot 1412 is designed such that an angle of rotation of the protective cap 16 relative to the adapter body 14 is less than or equal to the second angle, where the second angle is less than or equal to 90°. Therefore, assembly and disassembly of the protective cap 16 are simple and time-saving, and a snap-fit connection between the protective cap 16 and the adapter body 14 is highly stable and secure. In this way, the protective cap 16 can effectively protect the adapter body 14 from water, dust, and the like, thereby helping improve reliability of the adapter 1. The protective cap 16 is connected to the adapter body 14 using the connection lanyard 12 such that the protective cap 16 is difficult to be detached, thereby improving the reliability of the adapter 1.

An indicative arrow sign 1612 may be disposed on an outer sidewall of the connection cap portion 161, to guide a user to execute assembly and disassembly actions. An arrow sign 1417 used to indicate an insertion direction is disposed on the outer sidewall 1411 of the input end 141. When the indicative arrow sign 1612 is aligned with the arrow sign 1417 on the outer sidewall 1411 of the input end 141, the protective cap 16 can be aligned with the adapter body 14, to be quickly mounted on the adapter body 14. When the indicative arrow sign 1612 is used with the alignment arrow mark 1441 on the stop flange 144, a connection/disconnection state of the protective cap 16 and the adapter body 14 can be indicated.

Optionally, a sealing groove 1418 is disposed on the outer sidewall 1411 of the input end 141. The sealing groove 1418 is an annular groove. The sealing groove 1418 is located on a side that is of the lock slot 1412 and that is close to the output end 142. The sealing ring 15 is mounted in the sealing groove 1418. When the protective cap 16 is connected to the adapter body 14, the sealing ring 15 is firmly pressed between a groove wall of the sealing groove 1418 and an inner sidewall of the connection cap portion 161. In this case, the sealing ring 15 seals a gap between the input end 141 and the connection cap portion 161, to prevent external moisture, dust, and the like from entering the penetration hole 143, thereby extending a service life of the adapter 1.

Figure 5:
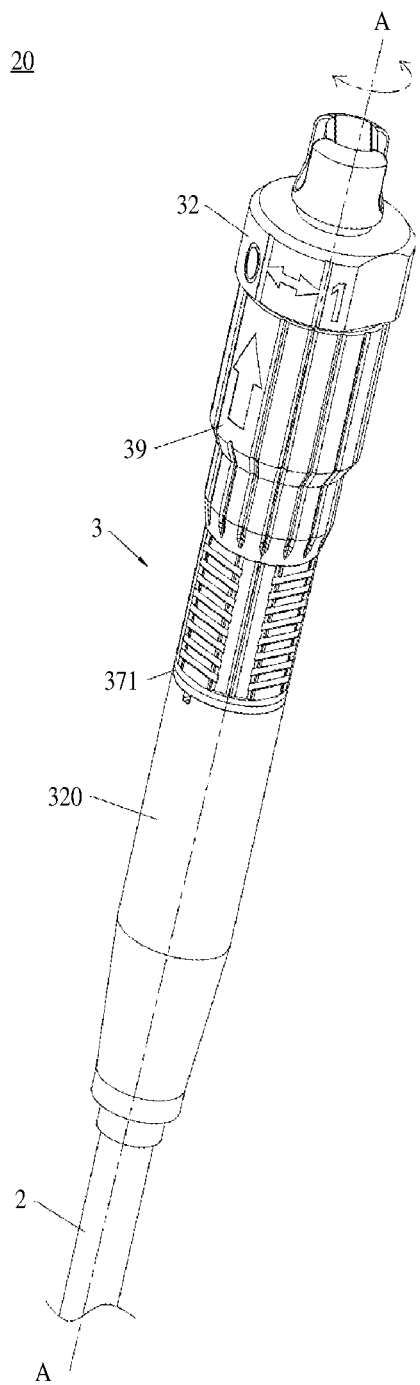
FIG. 5 is a schematic diagram of a structure of a prefabricated optical fiber according to an embodiment of this application.
Figure 6:
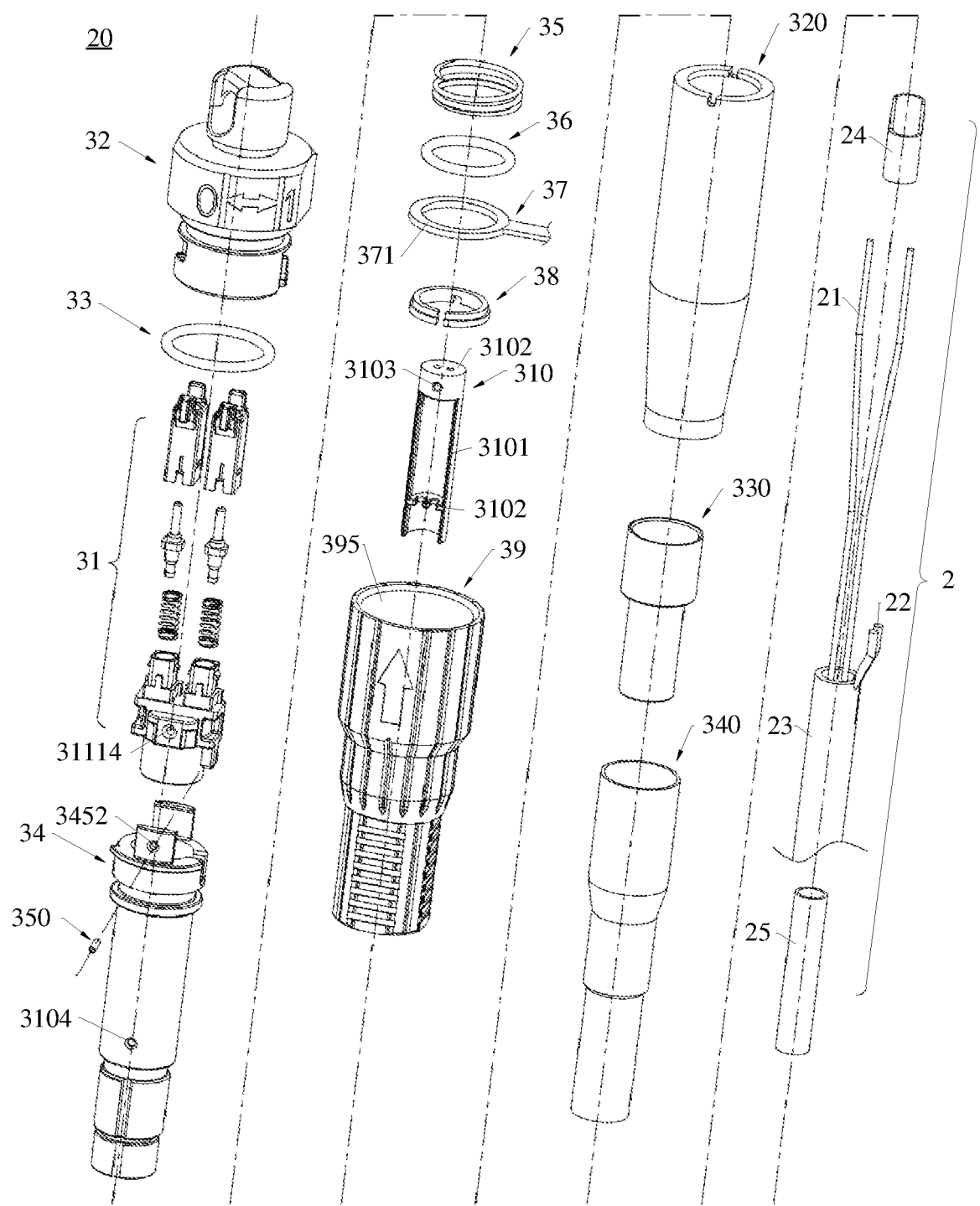
FIG. 6 is a schematic exploded-view diagram of the prefabricated optical fiber shown in FIG. 5.

Referring to FIG. 2, FIG. 5 and FIG. 6, FIG. 5 is a schematic diagram of a structure of a prefabricated optical fiber 20 according to an embodiment of this application, and FIG. 6 is a schematic exploded-view diagram of the prefabricated optical fiber 20 shown in FIG. 5. An optical fiber connector 3 of the prefabricated optical fiber 20 shown in FIG. 5 corresponds to the optical fiber connector 3 shown in FIG. 2. A part of a structure of a lanyard 37 of the optical fiber connector 3 is not shown in FIG. 5 and FIG. 6.

The prefabricated optical fiber 20 includes an optical cable 2 and the optical fiber connector 3. The optical fiber connector 3 includes a dust cap 32, a first sealing ring 33, a connecting piece 31, a main shaft 34, an elastic part 35, a second sealing ring 36, the lanyard 37, a snap ring 38, an adhesive container 310, a lock cap 39, a tail ferrule 320, a metal crimp ring 330, and a sealing sleeve 340.

The lock cap 39, one end 371 of the lanyard 37, and the tail ferrule 320 are arranged in an axial direction (parallel to a line A-A in FIG. 5) of the optical fiber connector 3. The lock cap 39 is a hollow cylinder (which may also be referred to as a socket, that is, the cylinder has an inner through-hole structure that penetrates from one end of the cylinder to the other end). The tail ferrule 320 is a hollow cylinder. An inner through-hole 395 of the lock cap 39 is connected to an inner through-hole of the tail ferrule 320. The connecting piece 31 is partially located in the inner through-hole 395 of the lock cap 39, and the connecting piece 31 partially protrudes relative to an end that is of the lock cap 39 and that is away from the tail ferrule 320. The optical cable 2 of the prefabricated optical fiber 20 can extend from one end that is of the tail ferrule 320 and that is away from the lock cap 39 sequentially into the inner through-hole of the tail ferrule 320 and the inner through-hole 395 of the lock cap 39, to be connected to the connecting piece 31. Other structures of the optical fiber connector 3 are located in the inner through-hole 395 of the lock cap 39 and the inner through-hole of the tail ferrule 320.

The dust cap 32 is connected to the other end 372 of the lanyard 37. The lanyard 37 is bendable. As shown in FIG. 5, when the optical fiber connector 3 is not connected to an adapter 1, the dust cap 32 may be mounted on one end that is of the lock cap 39 and that is away from the tail ferrule 320, to be sleeved on an outer side of the connecting piece 31, thereby achieving waterproof and dustproof effects and protecting the connecting piece 31. As shown in FIG. 2, when the optical fiber connector 3 is to be connected to the adapter 1, the dust cap 32 is detached from the lock cap 39 such that the connecting piece 31 is exposed and can be connected to the adapter 1 through insertion. However, the dust cap 32 is still connected to another structure of the optical fiber connector 3 using the lanyard 37, to prevent the dust cap 32 from getting lost. The dust cap 32 can be mounted to the lock cap 39 again after the optical fiber connector 3 is detached from the adapter 1 such that the optical fiber connector 3 allows frequent insertion and detachment, thereby improving reliability of the optical fiber connector 3.

Figure 7:
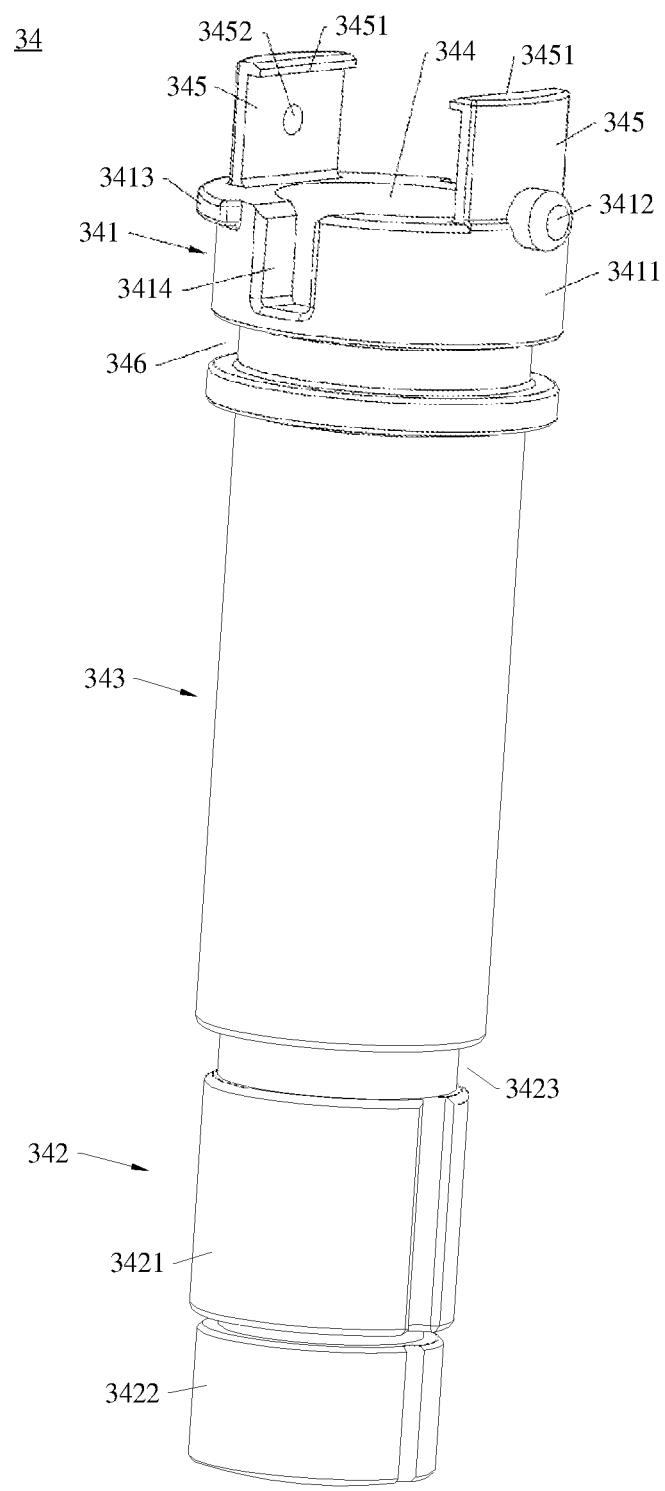
FIG. 7 is a schematic diagram of a three-dimensional structure of the main shaft shown in FIG. 6.
Figure 8:
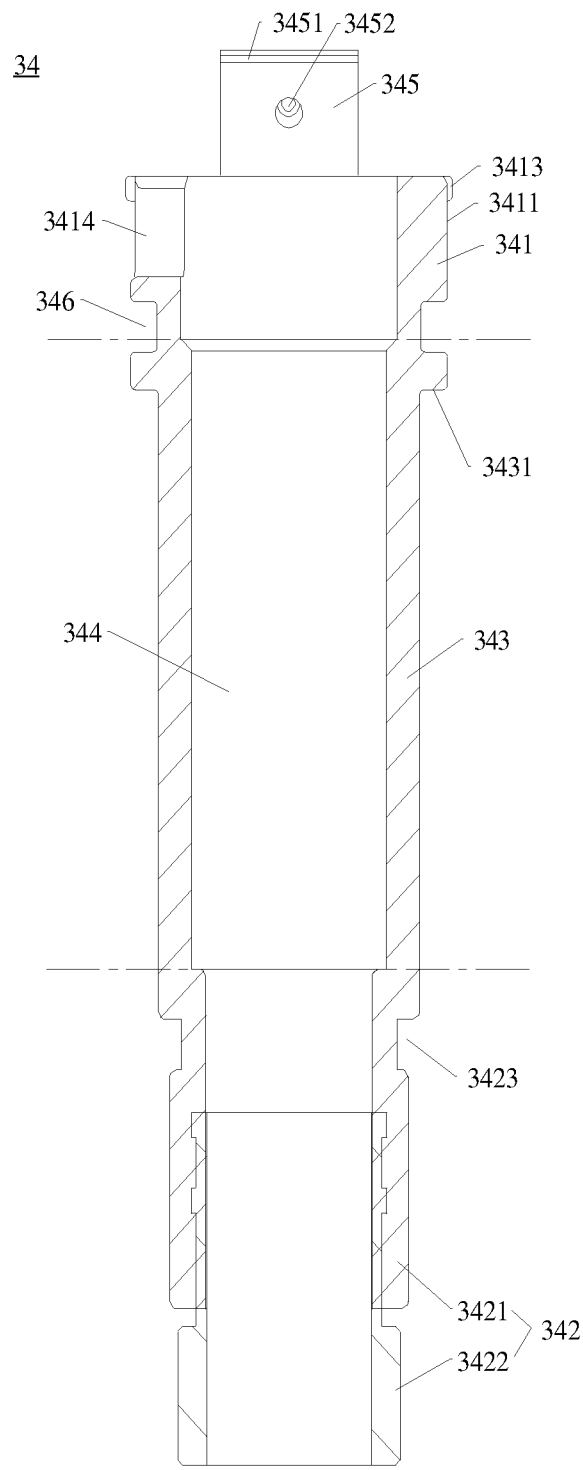
FIG. 8 is a schematic diagram of an internal structure of the main shaft shown in FIG. 7.

Referring to FIG. 6 to FIG. 8, FIG. 7 is a schematic diagram of a three-dimensional structure of the main shaft 34 shown in FIG. 6, and FIG. 8 is a schematic diagram of an internal structure of the main shaft 34 shown in FIG. 7.

The main shaft 34 includes a head end 341 and a tail end 342 that is away from the head end 341. The main shaft 34 further includes a transition section 343 located between the head end 341 and the tail end 342. The head end 341, the transition section 343, and the tail end 342 are sequentially arranged. The main shaft 34 is a hollow cylinder. A through hole 344 extending from the head end 341 to the tail end 342 is disposed in the main shaft 34. The through hole 344 is an inner through-hole of the main shaft 34. In this embodiment, an inner diameter of the head end 341 is greater than an inner diameter of the transition section 343. The inner diameter of the transition section 343 is greater than an inner diameter of the tail end 342. The through hole 344 is a hole with varying diameters. The main shaft 34 is substantially a step-shaped hollow circular cylinder. In another embodiment, the through hole 344 may alternatively be a through-hole in another shape.

Two lugs 345 are disposed on a top that is of the head end 341 and that is away from the transition section 343. The two lugs 345 are disposed opposite to each other. A limiting block 3451 is disposed on a top that is of the lug 345 and that is away from the transition section 343. The two limiting blocks 3451 of the two lugs 345 are bent towards each other. A first locating hole 3452 is disposed on one lug 345. A limiting bump 3412 and a limiting flange 3413 are further disposed on an outer sidewall 3411 of the head end 341. The limiting bump 3412 and the limiting flange 3413 are disposed facing away from each other. The limiting bump 3412 and the limiting flange 3413 may be disposed close to the two lugs 345 respectively. An insertion slot 3414 is further disposed on the head end 341. The insertion slot 3414 connects the through hole 344 to an outer side of the main shaft 34. The insertion slot 3414 extends to the top of the head end 341.

A sealing groove 346 wrapping around the through hole 344 is disposed on an outer circumferential side of the main shaft 34. The sealing groove 346 is a continuous annular groove. In this embodiment, the sealing groove 346 is partially located on the head end 341 and partially located on the transition section 343. In another embodiment, the sealing groove 346 may alternatively be completely located on the head end 341, or completely located on the transition section 343.

A first limiting surface 3431 facing the tail end 342 is disposed on the transition section 343. The first limiting surface 3431 is located on a side that is of the sealing groove 346 and that is close to the tail end 342. The first limiting surface 3431 is located on an outer sidewall of the transition section 343.

The tail end 342 includes a rubber portion 3421 close to the head end 341 and a metal portion 3422 that is away from the head end 341. The metal portion 3422 is partially located in the rubber portion 3421 and is fixedly connected to the rubber portion 3421. The metal portion 3422 and the rubber portion 3421 may be integrally formed through in-mold decoration (in-mold decoration, IMD). The metal portion 3422 and the rubber portion 3421 may alternatively form an integrated structure through assembly (for example, a threaded connection or a snap-fit connection).

A limiting groove 3423 wrapping around the through hole 344 is further disposed on an outer circumferential side of the tail end 342. The limiting groove 3423 is located on the rubber portion 3421. The limiting groove 3423 is a continuous annular groove.

Figure 9A:
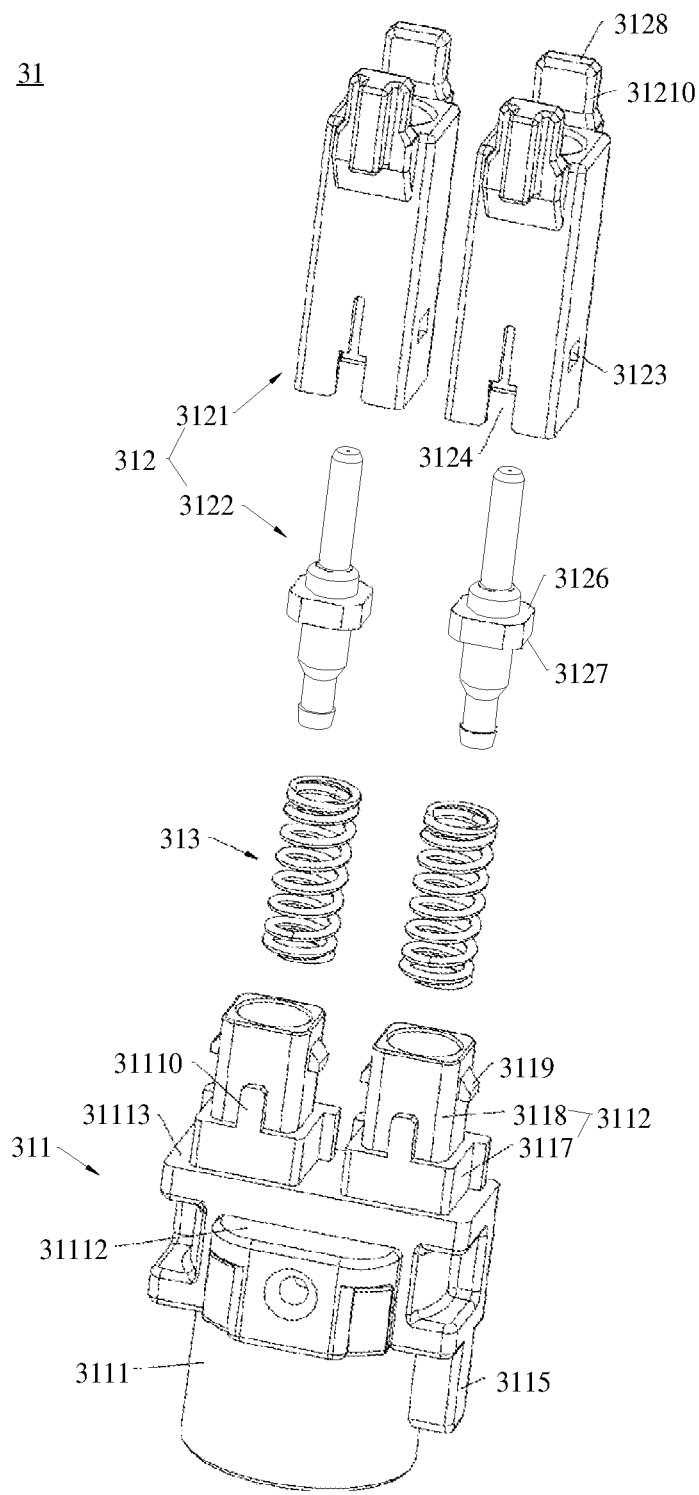
FIG. 9A is a schematic diagram of a structure of a connecting piece shown in FIG. 6.
Figure 9B:
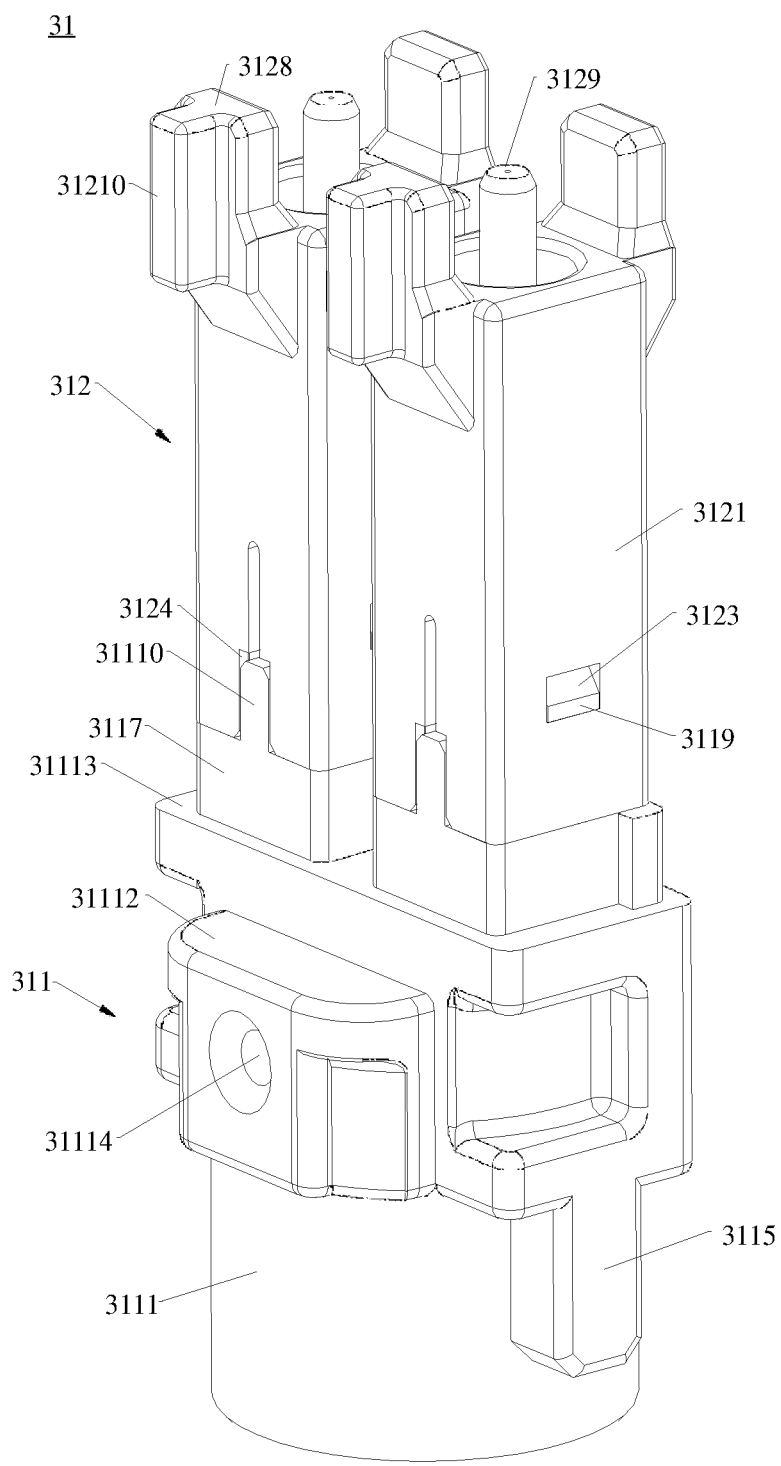
FIG. 9B is a schematic diagram of an assembly structure of the connecting piece shown in FIG. 9A.
Figure 10:
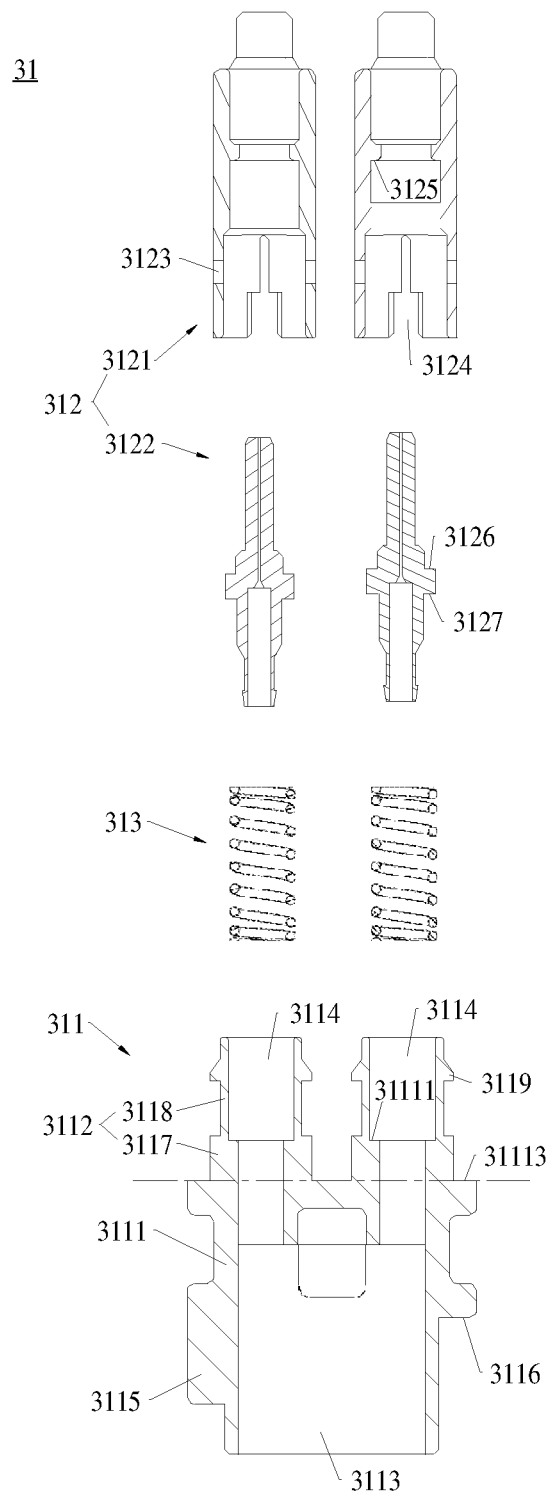
FIG. 10 is a schematic diagram of an internal structure of the connecting piece shown in FIG. 9A.
Figure 11:
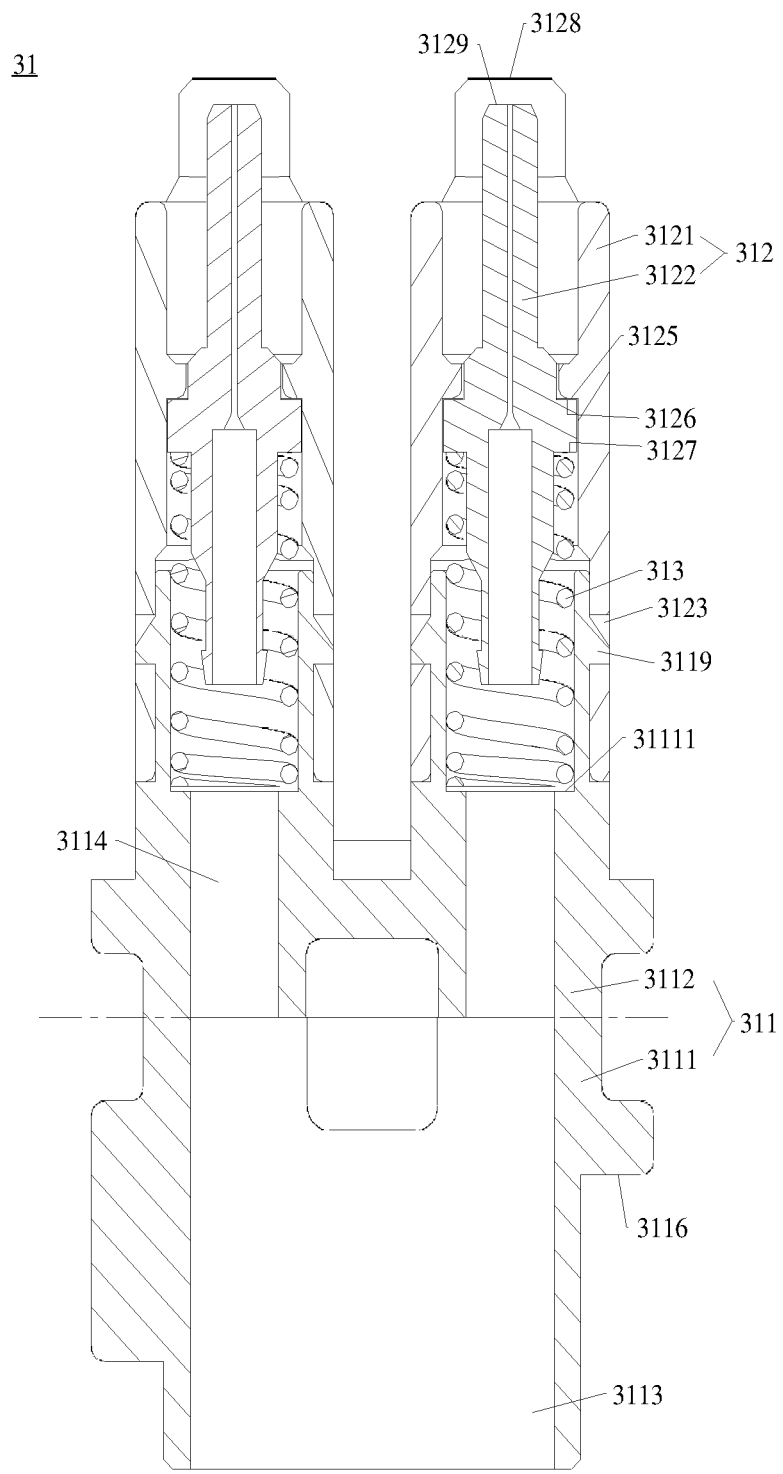
FIG. 11 is a schematic diagram of an internal structure of an assembled connecting piece shown in FIG. 10.

Referring to FIG. 6 and FIG. 9A to FIG. 11, FIG. 9A is a schematic diagram of a structure of the connecting piece 31 shown in FIG. 6, FIG. 9B is a schematic diagram of an assembly structure of the connecting piece 31 shown in FIG. 9A, FIG. 10 is a schematic diagram of an internal structure of the connecting piece 31 shown in FIG. 9A, and FIG. 11 is a schematic diagram of an internal structure of an assembled connecting piece 31 shown in FIG. 10. This embodiment is described using an example in which the connecting piece 31 is a lucent connector (LC). In another embodiment, the connecting piece 31 may alternatively be a square connector (SC), a miniature unit coupling (MU) connector, or a multi-fiber push on (MPO) connector.

The connecting piece 31 includes a connection base 311 and one or more connection terminals 312. The one or more connection terminals 312 are mounted on the connection base 311. The connecting piece 31 further includes an elastic connection part 313. A quantity of elastic connection parts 313 is the same as a quantity of the connection terminals 312. This embodiment is described using an example in which there are two connection terminals 312 and also two elastic connection parts 313.

In this embodiment, the one or more connection terminals 312 may be mounted on the connection base 311 together such that the optical fiber connector 3 may be applicable to more types of prefabricated optical fibers 20 with different requirements, and applicability of the optical fiber connector 3 is relatively good. When a plurality of connection terminals 312 are mounted on the connection base 311 together, a port density of the optical fiber connector 3 is relatively high.

The connection base 311 includes a fastening portion 3111 and one or more mounting portions 3112 located on a side of the fastening portion 3111. The fastening portion 3111 and the one or more mounting portions 3112 are integrally formed. That is, the connection base 311 is integrally formed. A quantity of the mounting portions 3112 is the same as a quantity of the connection terminals 312. When there are a plurality of mounting portions 3112, the plurality of mounting portions 3112 are located on one side of the fastening portion 3111. The one or more mounting portions 3112 are partially inserted into the one or more connection terminals 312 in a one-to-one correspondence manner. In this case, the one or more connection terminals 312 are fastened to the connection base 311 through insertion.

In this embodiment, the mounting portion 3112 is inserted into the connection terminal 312 such that the optical fiber connector 3 implements fastening of the connection terminal 312 to the connection base 311. Therefore, the connection base 311 can have an integrally formed structure, thereby reducing manufacturing costs and manufacturing difficulty of the connection base 311. In addition, the connection terminal 312 is fastened to the connection base 311 through insertion. Such an assembly process is more convenient and less difficult.

Optionally, a connectivity structure 3113 is formed in the fastening portion 3111. A through-hole 3114 is formed in each mounting portion 3112. As shown in FIG. 10, the connectivity structure 3113 includes one inlet and two outlets that are connected to the inlet. Two through-holes 3114 of two mounting portions 3112 are connected to the two outlets respectively. In this case, a cable wire 21 of the optical cable 2 (refer to FIG. 6) may extend into the through-hole 3114 of the mounting portion 3112 through the connectivity structure 3113 of the fastening portion 3111.

Optionally, a locating plane 31112 facing the one or more mounting portions 3112 is disposed on the fastening portion 3111. When the connection base 311 of the connecting piece 31 is mounted to the main shaft 34 (refer to FIG. 7), the two limiting blocks 3451 on the two lugs 345 of the head end 341 of the main shaft 34 are snap-fitted to the locating plane 31112 such that the connecting piece 31 is fastened relative to the main shaft 34, thereby preventing the connecting piece 31 from detaching from the main shaft 34.

Optionally, an insertion block 3115 is formed on an outer sidewall of the fastening portion 3111. A limiting plane 3116 facing away from the one or more mounting portions 3112 is further disposed on the fastening portion 3111. The limiting plane 3116 is a part of the outer sidewall of the fastening portion 3111. A second locating hole 31114 is further disposed on an outer circumferential side of the fastening portion 3111. A fastening end face 31113 facing the one or more mounting portions 3112 is disposed on the fastening portion 3111. The one or more mounting portions 3112 extend from the fastening end face 31113 in a direction away from the fastening portion 3111.

A mounting bottom 3117 and a mounting top 3118 are disposed on each mounting portion 3112. The mounting bottom 3117 is fastened to the fastening end face 31113. The mounting top 3118 is connected to a top end face that is of the mounting bottom 3117 and that is away from the fastening end face 31113. A limiting protrusion 3119 is disposed on the mounting portion 3112. For example, two limiting protrusions 3119 are disposed facing away from each other on the mounting top 3118. A locating block 31110 between the two limiting protrusions 3119 is further disposed on the mounting portion 3112. The second locating hole 31114 and the two limiting protrusions 3119 are all located on an outer sidewall of the mounting top 3118. Projection of the outer sidewall of the mounting top 3118 on the top end face of the mounting bottom 3117 falls within a scope of the top end face. An abutting face 31111 facing away from the fastening portion 3111 is disposed on an inner side of each mounting portion 3112. The abutting face 31111 is an annular surface disposed around an inner through-hole of the mounting portion 3112.

Optionally, each connection terminal 312 includes a protective housing 3121 and a ferrule 3122 mounted in the protective housing 3121. The protective housing 3121 is substantially a hollow square cylinder. A limiting hole 3123 is disposed on the protective housing 3121. For example, two limiting holes 3123 opposite to each other are disposed on the protective housing 3121. The limiting hole 3123 is connected to an inner through-hole of the protective housing 3121. During assembly, the mounting portion 3112 is partially inserted into the corresponding protective housing 3121, and the limiting protrusion 3119 is partially or completely clamped into the limiting hole 3123. A fitting structure between the limiting protrusion 3119 and the limiting hole 3123 can fasten the connection terminal 312 relative to the connection base 311.

In this embodiment, the connection terminal 312 and the connection base 311 are fastened to each other through a snap-fit connection between the limiting hole 3123 and the limiting protrusion 3119 such that the connection terminal 312 can be fastened to the connection base 311 through insertion. This connection manner is easy to implement and stable.

A locating slot 3124 between the two limiting holes 3123 is further disposed on the protective housing 3121. The two limiting holes 3123 and the locating slot 3124 are located on three sidewalls of the protective housing 3121 respectively. The locating slot 3124 extends to a bottom end face that is of the protective housing 3121 and that faces the fastening portion 3111. The locating slot 3124 is configured to accommodate the locating block 31110. During an insertion connection between the protective housing 3121 and the mounting portion 3112, the locating block 31110 is fitted to the locating slot 3124 such that the protective housing 3121 and the mounting portion 3112 are located. Therefore, insertion of the protective housing 3121 and the mounting portion 3112 is smoother.

Optionally, an inner surface of the protective housing 3121 includes a first locating surface 3125 facing the fastening portion 3111. The inner surface is a hole wall of the inner through-hole of the protective housing 3121. The first locating surface 3125 faces a bottom end face of the protective housing 3121. The ferrule 3122 is of a hollow cylinder structure. The ferrule 3122 has a bottom close to the fastening portion 3111 and a top away from the fastening portion 3111. An outer sidewall of the ferrule 3122 includes a second locating surface 3126 facing away from the fastening portion 3111. The second locating surface 3126 faces a top of the ferrule 3122. The outer sidewall of the ferrule 3122 further includes an abutting face 3127 facing the fastening portion 3111. The abutting face 3127 and the second locating surface 3126 are disposed facing away from each other.

The elastic connection part 313 is compressed between the ferrule 3122 and the mounting portion 3112. An elastic force of the elastic connection part 313 firmly presses the second locating surface 3126 against the first locating surface 3125. In an embodiment, one end of the elastic connection part 313 is located between the ferrule 3122 and a body of the protective housing 3121, and abuts against the abutting face 3127 of the ferrule 3122. The other end of the elastic connection part 313 is located in the mounting portion 3112 and abuts against the abutting face 31111 of the mounting portion 3112. In this case, the ferrule 3122 is fastened relative to the protective housing 3121, and the ferrule 3122 is not swaying. This helps ensure connection reliability between the optical fiber connector 3 and the adapter 1.

Optionally, a top end face 3128 that is of the protective housing 3121 and that is away from the connection base 311 protrudes relative to a top end face 3129 that is of the ferrule 3122 and that is away from the connection base 311. In this case, the top end face 3128 of the protective housing 3121 can protect the ferrule 3122. When the optical fiber connector 3 is connected to the adapter 1, the top end face 3128 of the protective housing 3121 is, earlier than the ferrule 3122, inserted into the adapter 1, to prevent the ferrule 3122 from damage due to an inaccurate action of an installation engineer in a blind-mate scenario, thereby lowering a requirement for inserting the optical fiber connector 3 and extending a service life of the optical fiber connector 3.

In this embodiment, one or more protective protrusions 31210 are disposed on a top of the protective housing 3121. An end face that is of the one or more protective protrusions 31210 and that is away from the connection base is the top end face 3128 of the protective housing 3121. For example, two protective protrusions 31210 opposite to each other are further disposed on the top of the protective housing 3121. The two protective protrusions 31210 are located on two sides of the inner through-hole of the protective housing 3121 respectively. The two protective protrusions 31210 are respectively connected to the two sidewalls that are of the protective housing 3121 and that face away from each other.

Figure 12:
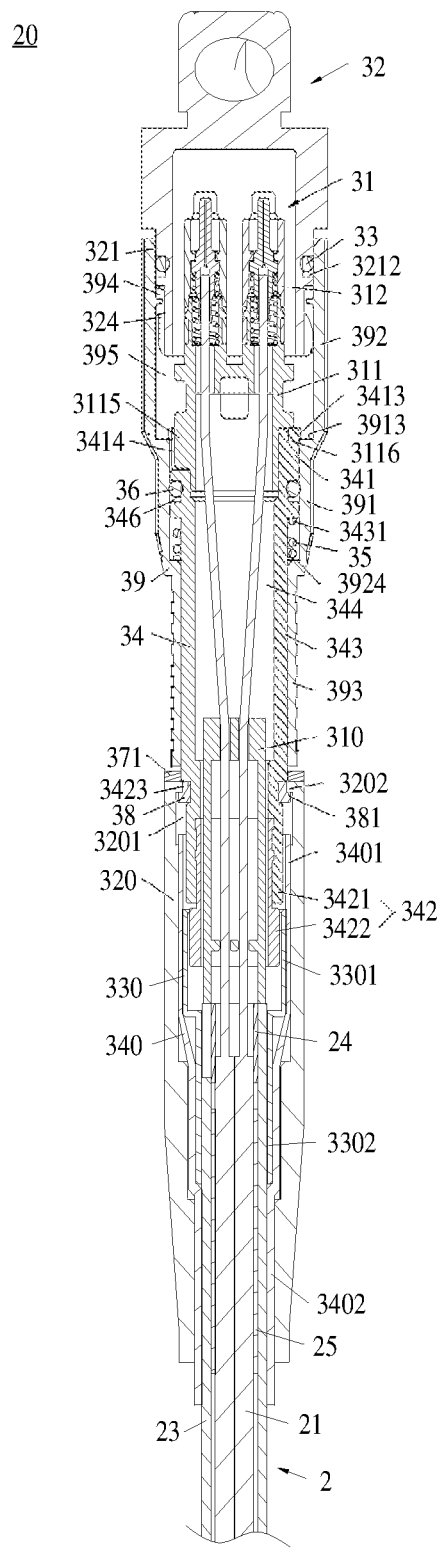
FIG. 12 is a sectional view along a line A-A of the prefabricated optical fiber shown in FIG. 5.

Referring to FIG. 8, FIG. 11 and FIG. 12, FIG. 12 is a sectional view along a line A-A of the prefabricated optical fiber 20 shown in FIG. 5.

The connecting piece 31 is fixedly connected to the head end 341 of the main shaft 34 and partially accommodated in the through hole 344. The optical cable 2 extends into the through hole 344 and is connected to the connecting piece 31. In this embodiment of this application, the term "fixedly connected" indicates that a relative location relationship between two assembled components is fixed, and a connection between the two components may be a detachable connection, or a non-detachable connection. In an embodiment, one end of the connection base 311 of the connecting piece 31 is inserted into the through hole 344, and the one or more connection terminals 312 are fastened to the other end of the connection base 311. The limiting plane 3116 of the connection base 311 abuts against a top end face of the main shaft 34 (that is, a top end face that is of the head end 341 and that is away from the tail end 342). In this case, the connecting piece 31 and the main shaft 34 are located to each other in the axial direction of the optical fiber connector 3. Referring to FIG. 6, the second locating hole 31114 of the fastening portion 3111 of the connecting piece 31 aligns with the first locating hole 3452 of the lug 345 of the main shaft 34. A bolt 350 may be inserted into the first locating hole 3452 and the second locating hole 31114 such that the connecting piece 31 and the main shaft 34 are located to each other in the axial direction and a circumferential direction (perpendicular to and around the axial direction of the optical fiber connector 31) of the optical fiber connector 31.

During assembly, the insertion block 3115 (refer to FIG. 9A and FIG. 9B) on the connection base 311 of the connecting piece 31 is inserted into the insertion slot 3414 (refer to FIG. 7) on the head end 341 of the main shaft 34. The insertion block 3115 is fitted to the insertion slot 3414 such that the main shaft 34 and the connecting piece 31 are located to each other in the circumferential direction of the optical fiber connector 31.

Figure 13:
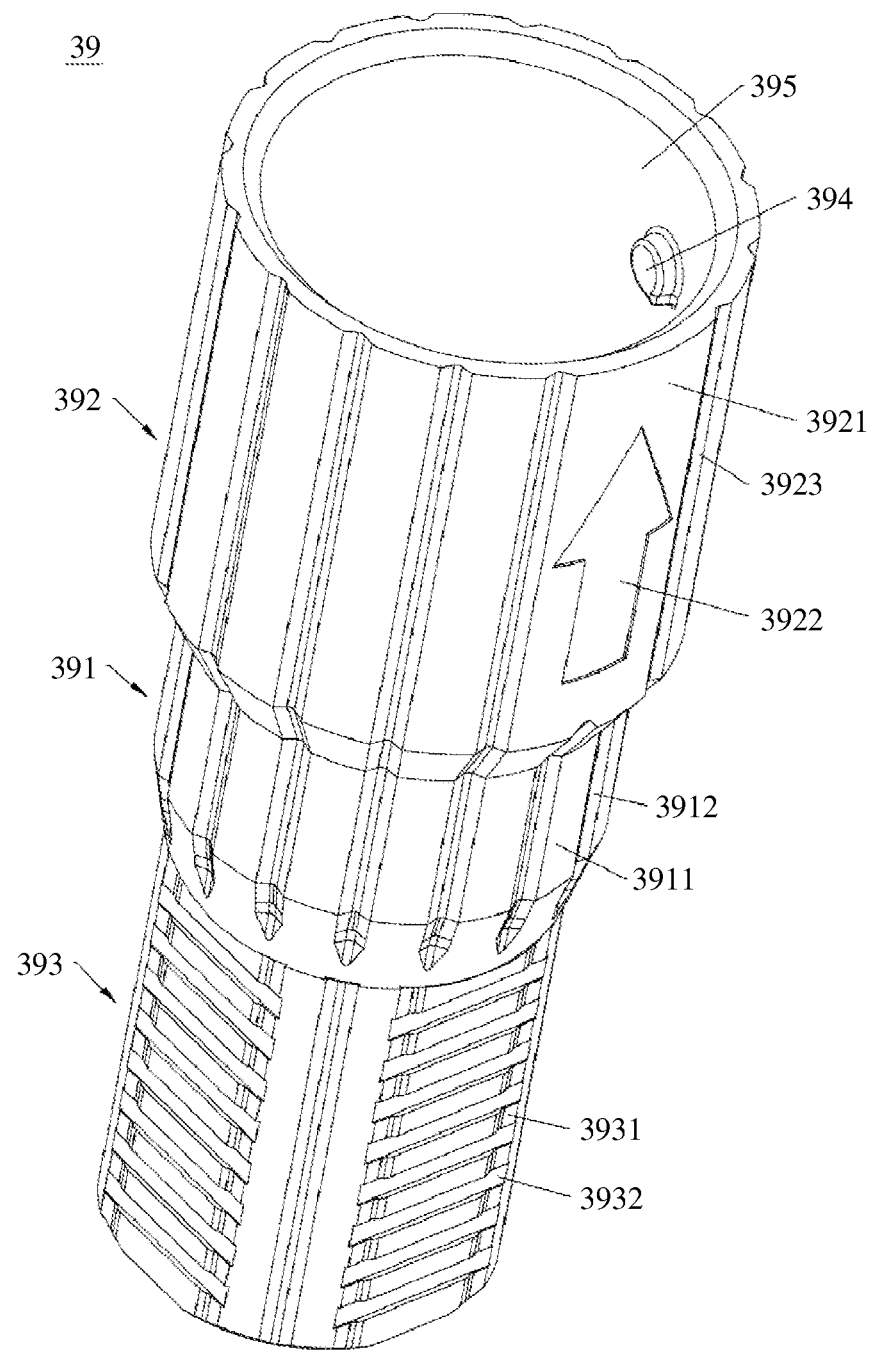
FIG. 13 is a schematic diagram of a structure of a lock cap shown in FIG. 6.
Figure 14:
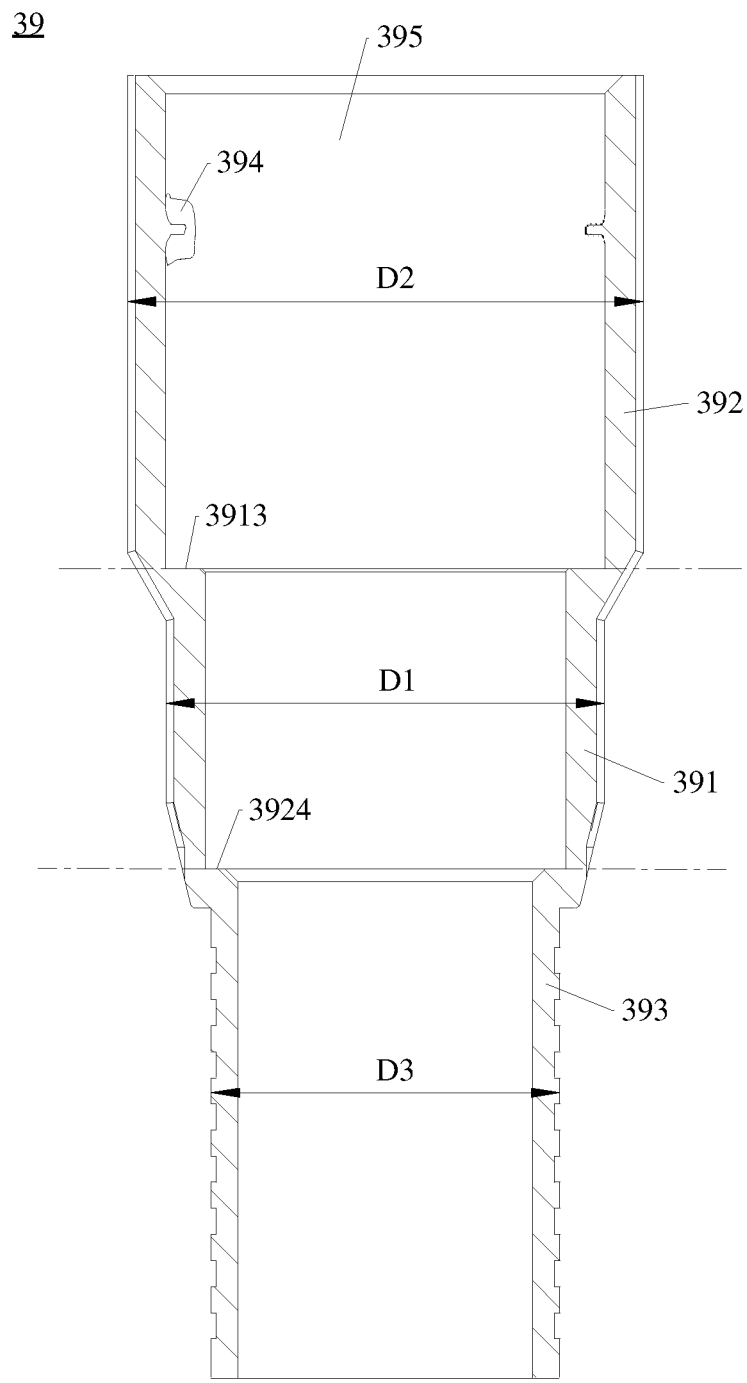
FIG. 14 is a schematic diagram of an internal structure of the lock cap shown in FIG. 13.

Referring to FIG. 12 to FIG. 14, FIG. 13 is a schematic diagram of a structure of the lock cap 39 shown in FIG. 6, and FIG. 14 is a schematic diagram of an internal structure of the lock cap 39 shown in FIG. 13.

The lock cap 39 is a hollow cylinder. The lock cap 39 is sleeved on the outer side of the main shaft 34 and the outer side of the connecting piece 31. The lock cap 39 includes a sealing portion 391 and a connection portion 392 that is connected to a side of the sealing portion 391. The lock cap 39 further includes a limiting portion 393 connected to a side that is of the sealing portion 391 and that is away from the connection portion 392. The connection portion 392, the sealing portion 391, and the limiting portion 393 are sequentially arranged in the axial direction of the optical fiber connector 3. The inner through-hole 395 of the lock cap 39 penetrates from an end of the connection portion 392 to an end of the limiting portion 393. The sealing portion 391 is rotationally connected to the outer side of the head end 341 of the main shaft 34. The connection portion 392 is located on a side that is of the head end 341 and that is away from the tail end 342. The connection portion 392 wraps around the connecting piece 31. The limiting portion 393 is located on an outer side of the transition section 343. Referring to FIG. 2, when the optical fiber connector 3 is connected to the adapter 1, the connecting piece 31 is partially inserted into the input end 141 of the adapter body 14, and the input end 141 of the adapter body 14 is inserted into the connection portion 392 of the lock cap 39. The connection portion 392 is configured to partially accommodate the adapter 1 when the connecting piece 31 is inserted into the adapter 1.

In this embodiment, an inner diameter of the connection portion 392 is greater than an inner diameter of the sealing portion 391. The inner diameter of the sealing portion 391 is greater than an inner diameter of the limiting portion 393. The inner through-hole 395 of the lock cap 39 is a hole with varying diameters. In another embodiment, the inner through-hole 395 of the lock cap 39 may alternatively be a through-hole in another shape.

In this embodiment, an outer diameter D1 of the sealing portion 391 is less than an outer diameter D2 of the connection portion 392. An outer diameter D3 of the limiting portion 393 may be further less than the outer diameter D1 of the sealing portion 391. That is, the outer diameter D2 of the connection portion 392, the outer diameter D1 of the sealing portion 391, and the outer diameter D3 of the limiting portion 393 sequentially decreases. An outer circumferential surface of the lock cap 39 has a step-shaped structure, to meet a requirement for accommodation capacity of the lock cap 39 (where the lock cap 39 is required to accommodate most components of the optical fiber connector 3), and minimize a volume of the lock cap 39. Therefore, the optical fiber connector 3 is more compact.

Optionally, a lock protrusion 394 is disposed on an inner side of the connection portion 392. The lock protrusion 394 is located on a hole wall of the inner through-hole 395 of the lock cap 39. In this embodiment, there are two lock protrusions 394. The two lock protrusions 394 are disposed opposite to each other. In another embodiment, there may be one or more than three lock protrusions 394.

Referring to FIG. 2, FIG. 3, and FIG. 13, the lock protrusion 394 is configured to be snap-fitted to the lock slot 1412 of the adapter 1 when the lock cap 39 is rotated by a first angle relative to the adapter 1. The first angle is less than or equal to 90°. In an embodiment, when the optical fiber connector 3 is connected to the adapter 1, the connecting piece 31 is partially inserted into the penetration hole 143 of the adapter body 14, the connection portion 392 partially accommodates the input end 141 of the adapter body 14 and the lock protrusion 394 is located in the lock slot 1412. The lock protrusion 394 is snap-fitted to the lock slot 1412 when the lock cap 39 is rotated by the first angle relative to the adapter body 14. The first angle is less than or equal to the second angle. The lock protrusion 394 slides from the slide-in area 1413 to the lock slot 1412. When the lock cap 39 is rotated relative to the adapter body 14, the lock protrusion 394 slides through the slide area 1414 to the snap-fit area 1415, and then is snap-fitted to the snap-fit surface 1416 of the snap-fit area 1415. That is, the penetration hole 143 of the adapter body 14 may be configured to accommodate a part of the connecting piece 31 of the optical fiber connector 3 when the input end 141 is inserted into the lock cap 39 of the optical fiber connector 3. The lock slot 1412 of the adapter body 14 is configured to accommodate the lock protrusion 394 on the inner side of the lock cap 39 and be snap-fitted to the lock protrusion 394.

In this embodiment, the first angle of rotation of the lock cap 39 relative to the adapter body 14 is limited by a structure of the lock slot 1412, and the lock slot 1412 extends the second angle in the circumferential direction of the input end 141 of the adapter body 14 such that the first angle is less than or equal to the second angle. The lock cap 39 is connected to the adapter body 14 in a rotary snap-fit lock manner. Therefore, the structure of the lock slot 1412 can be designed, to set or change a size of the first angle, thereby changing the angle of rotation required when the lock cap 39 is connected to the adapter body 14.

In this embodiment, the lock cap 39 is connected to the adapter body 14 in a rotary snap-fit lock manner, the angle of rotation of the lock cap 39 relative to the adapter body 14 is less than or equal to the second angle, and the second angle is less than or equal to 90° such that the lock cap 39 only needs to be rotated by an angle less than one fourth of a circle relative to the adapter body 14, to complete assembly or disassembly of the optical fiber connector 3 and the adapter 1. Therefore, assembly and disassembly of the optical fiber connection assembly 200 are simple and time-saving (approximately one fifth of a time required by a conventional optical fiber connection assembly, or even a shorter time), the snap-fit connection between the optical fiber connector 3 and the adapter 1 is highly stable and secure, and signal transmission of the optical fiber connection assembly 200 is highly reliable.

Further, no conventional elastic arm is disposed on the connection terminal 312 (refer to FIG. 9B) of the optical fiber connector 3 in this embodiment. A lock requirement between the optical fiber connector 3 and the adapter 1 is met using a rotary snap-fit lock structure such that a conventional two-step assembly/disassembly process (elastic arm assembly/disassembly and protective cover assembly/disassembly) is simplified into a one-step assembly/disassembly process, thereby further reducing difficulty of and a time for assembly and disassembly of the optical fiber connector 3 and the adapter 1. In addition, no elastic arm structure is disposed on the connection terminal 312 such that a volume of the connection terminal 312 is reduced. Therefore, a port density can be increased without increasing a volume of the optical fiber connector 3.

A snap-fit matching surface matching the snap-fit surface 1416 may be further disposed on the lock protrusion 394, to improve snap-fit stability between the lock protrusion 394 and the adapter body 14. It can be understood that a structure of the lock protrusion 394 matches the structure of the lock slot 1412, and a rotary snap-fit lock connection structure for the lock cap 39 and the adapter body 14 is the same as a rotary snap-fit lock connection structure for the protective cap 16 of the adapter 1 and the adapter body 14.

An indicative arrow mark 3922 is disposed on an outer sidewall 3921 of the connection portion 392. When the optical fiber connector 3 is connected to the adapter 1, if the indicative arrow mark 3922 is aligned with the arrow sign 1417 on the outer sidewall 1411 of the input end 141, the lock cap 39 can be aligned with the adapter body 14, to be quickly mounted on the adapter body 14. When the indicative arrow mark 3922 is used with the alignment arrow mark 1441 on the stop flange 144 of the adapter body 14, a connection/disconnection state of the lock cap 39 and the adapter body 14 can be indicated.

Shallow grooves are disposed on both the outer sidewall 3921 of the connection portion 392 and an outer sidewall 3911 of the sealing portion 391. In an embodiment, a shallow groove 3923 of the connection portion 392 and a shallow groove 3912 of the sealing portion 391 are connected and continuously extend in an axial direction of the lock cap 39 (that is, the axial direction of the optical fiber connector 3). In another embodiment, the shallow groove 3923 of the connection portion 392 and the shallow groove 3912 of the sealing portion 391 may alternatively have another shape and another connection relationship. An outer sidewall of the limiting portion 393 includes a plurality of symmetrically arranged edge-cut planes 3931. There are four edge-cut planes 3931. Two edge-cut planes 3931 that are opposite to each other form one group of edge-cut planes 3931. A shallow groove 3932 is disposed on each edge-cut plane 3931. The shallow groove 3932 may extend in a direction perpendicular to the axial direction. This provides a user with better hand feel and the lock cap 39 is not likely to slide when the user holds or operates the lock cap 39.

Referring to FIG. 12 and FIG. 14, optionally, a stop plane 3913 facing the connection portion 392 is disposed on the sealing portion 391. The stop plane 3913 is a part of the hole wall of the inner through-hole 395 of the lock cap 39. When the main shaft 34 is mounted in the lock cap 39 (that is, the main shaft 34 is inserted into the inner through-hole 395 of the lock cap 39), the limiting bump 3412 and the limiting flange 3413 (refer to FIG. 7) on the head end 341 of the main shaft 34 abut against the stop plane 3913 of the lock cap 39 such that the main shaft 34 and the lock cap 39 are located to each other.

Optionally, referring to FIG. 14, a second limiting surface 3924 facing the sealing portion 391 is disposed on the limiting portion 393. The second limiting surface 3924 may be a part of an end face that is of the limiting portion 393 and that is connected to the sealing portion 391. The second limiting surface 3924 is a part of the hole wall of the inner through-hole 395 of the lock cap 39.

Referring to FIG. 8, FIG. 12, and FIG. 14, the optical fiber connector 3 further includes the elastic part 35. The elastic part 35 is located between the transition section 343 and the sealing portion 391, and two ends of the elastic part 35 abut against the first limiting surface 3431 and the second limiting surface 3924 respectively.

In this embodiment, the elastic part 35 is disposed such that the first limiting surface 3431 and the second limiting surface 3924 tend to move away from each other, and the lock cap 39 tends to move toward the tail end 342 of the main shaft 34. Therefore, when the lock cap 39 is connected to the adapter 1 (refer to FIG. 3), the lock protrusion 394 can be stably snap-fitted to the lock slot 1412 of the adapter body 14, and the connecting piece 31 and the adapter body 14 are fastened to each other in the axial direction of the optical fiber connector 3 such that a connection relationship between the lock cap 39 and the adapter 1 is reliable, thereby achieving good shockproof and anti-looseness effects.

Figure 15:
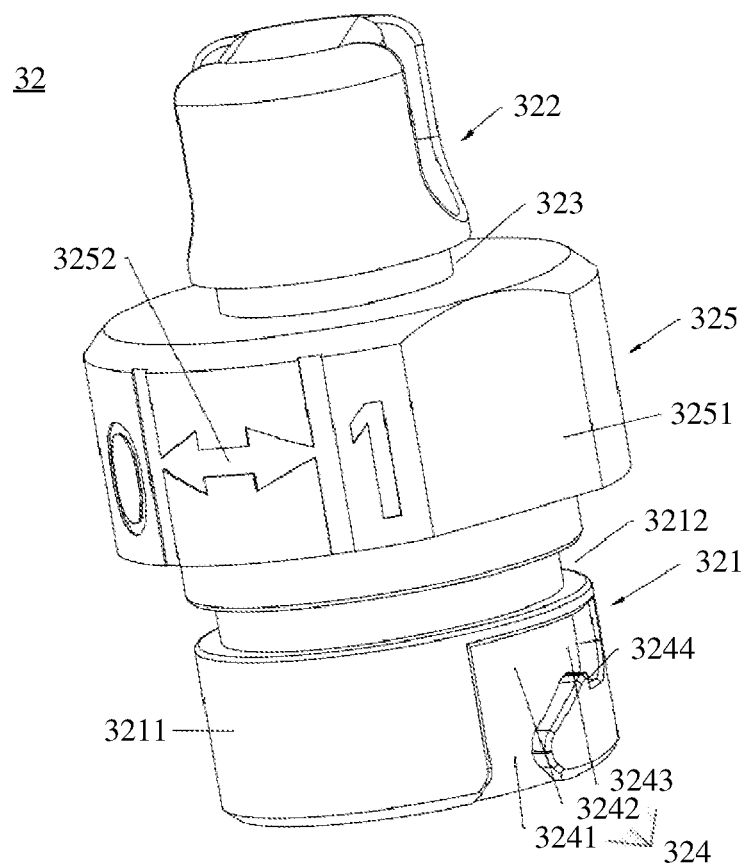
FIG. 15 is a schematic diagram of a structure of a dust cap shown in FIG. 6.

Referring to FIG. 2, FIG. 12, and FIG. 15, FIG. 15 is a schematic diagram of a structure of the dust cap 32 shown in FIG. 6.

Optionally, one end 371 of the lanyard 37 of the optical fiber connector 3 is sleeved on the outer side of the main shaft 34, and the other end 372 of the lanyard 37 is connected to the dust cap 32. In an embodiment, the dust cap 32 includes an insertion portion 321 and a holding portion 322. A top side of the insertion portion 321 is open. The holding portion 322 is connected to a bottom side of the insertion portion 321. A connection groove 323 is disposed between the insertion portion 321 and the holding portion 322. The connection groove 323 is a continuous annular groove. The end 372 that is of the lanyard 37 and that is away from the main shaft 34 is located in the connection groove 323, to connect the dust cap 32.

Optionally, a dustproof lock slot 324 is disposed on an end of the dust cap 32. The end of the dust cap 32 can extend into the connection portion 392, and the dustproof lock slot 324 is snap-fitted to the lock protrusion 394. In an embodiment, the dustproof lock slot 324 is disposed on an outer sidewall 3211 of the insertion portion 321. The dustproof lock slot 324 extends a third angle in a circumferential direction of the insertion portion 321. The third angle may be less than or equal to 90°. The outer sidewall 3211 of the insertion portion 321 is a cylindrical surface. The circumferential direction of the insertion portion 321 is a direction perpendicular to and around a central axis of the outer sidewall 3211 of the insertion portion 321. The third angle is a central angle of the dustproof lock slot 324. The third angle may be an angle from 30° to 90°, such as 30°, 45°, 60°, 75°, or 90°. The dustproof lock slot 324 includes a slide-in area 3241, a slide area 3242, and a snap-fit area 3243 that are sequentially connected. The slide area 3242 and the snap-fit area 3243 extend in the circumferential direction of the insertion portion 321. The slide-in area 3241 connects the slide area 3242 to an end face of the insertion portion 321. A snap-fit surface 3244 facing away from the slide-in area 3241 is disposed on the snap-fit area 3243. For example, a direction from the slide area 3242 to the snap-fit area 3243 is a slide-in direction, and an orientation of the snap-fit surface 3244 is opposite to the slide-in direction.

When the dust cap 32 is connected to the lock cap 39, the insertion portion 321 of the dust cap 32 completely or partially extends into the connection portion 392 of the lock cap 39. The connecting piece 31 partially extends into the insertion portion 321. The lock protrusion 394 of the lock cap 39 slides from the slide-in area 3241 to the dustproof lock slot 324. When the dust cap 32 is rotated relative to the lock cap 39 (or the lock cap 39 is rotated relative to the dust cap 32), the lock protrusion 394 slides through the slide area 3242 to the snap-fit area 3243, and then is snap-fitted to the snap-fit surface 3244 of the snap-fit area 3243. A snap-fit matching surface matching the snap-fit surface 3244 may be further disposed on the lock protrusion 394 of the lock cap 39, to improve snap-fit stability between the lock protrusion 394 and the dust cap 32.

It can be understood that, in this embodiment of this application, the lock cap 39 of the optical fiber connector 3 of the optical fiber connection assembly 200 is connected to the adapter body 14 of the adapter 1 using a rotary snap-fit lock structure, the lock cap 39 of the optical fiber connector 3 is connected to the dust cap 32 of the optical fiber connector 3 also using a rotary snap-fit lock structure, and the protective cap 16 of the adapter 1 is connected to the adapter body 14 also using a rotary snap-fit lock structure. Therefore, a connection structure of the protective cap 16 of the adapter 1 is similar to a connection structure of the lock cap 39 of the optical fiber connector 3, and a connection structure of the dust cap 32 of the optical fiber connector 3 is similar to a connection structure of the adapter body 14 of the adapter 1. In this embodiment, a connection between the optical fiber connector 3 and the adapter 1, a connection between components of the optical fiber connector 3, and a connection between components of the adapter 1 are implemented using same rotary snap-fit lock structures such that a structure of the optical fiber connection assembly 200 is further simplified and installation is less difficult.

In an embodiment, the third angle is equal to the second angle such that the connection action between the dust cap 32 and the lock cap 39 is the same as the connection action between the adapter body 14 and the lock cap 39, thereby improving user experience.

Further, there may be one, two, or more than three dustproof lock slots 324. This embodiment is described using an example in which there are two dustproof lock slots 324. The two dustproof lock slots 324 are disposed facing away from each other. In addition, the two dustproof lock slots 324 are centrosymmetrically distributed. In an embodiment, when rotated by 180° around the central axis of the outer sidewall 3211 of the insertion portion 321, one dustproof lock slot 324 overlaps the other dustproof lock slot 324. A quantity of the dustproof lock slots 324 may be designed based on the second angle, provided that a plurality of dustproof lock slots 324 are designed to be spaced apart from each other. For example, when the second angle is less than 60°, there may be three dustproof lock slots 324.

Optionally, the dust cap 32 further includes a middle portion 325 located between the insertion portion 321 and the holding portion 322. An alignment arrow mark 3252 is disposed on an outer sidewall 3251 of the middle portion 325. The alignment arrow mark 3252 is configured to indicate a connection/disconnection state of another component and the dust cap 32.

Referring to FIG. 6, FIG. 12, and FIG. 15, the first sealing ring 33 of the optical fiber connector 3 is located in the connection portion 392. When the optical fiber connector 3 is connected to the dust cap 32, the first sealing ring 33 is compressed between the connection portion 392 and the dust cap 32. A sealing connection groove 3212 is disposed on the outer sidewall 3211 of the insertion portion 321 of the dust cap 32. The sealing connection groove 3212 is located between the middle portion 325 and the dustproof lock slot 324. The first sealing ring 33 is mounted in the sealing connection groove 3212.

When the optical fiber connector 3 is connected to the adapter 1 (refer to FIG. 3), the first sealing ring 33 is configured to be compressed between the connection portion 392 and the adapter 1. In this case, the sealing ring 15 of the adapter 1 is detached from the sealing groove 1418. The first sealing ring 33 is mounted in the sealing groove 1418.

In this embodiment, the first sealing ring 33 is configured to seal a connection between the lock cap 39 and another component, to achieve waterproof and dustproof effects such that the optical fiber connector 3 can achieve a protection level of IP68 and has a longer service life and higher reliability.

Referring to FIG. 7, FIG. 12, and FIG. 14, the second sealing ring 36 of the optical fiber connector 3 is compressed between a groove wall of the sealing groove 346 and an inner side surface of the sealing portion 391. The inner side surface of the sealing portion 391 is a part of the hole wall of the inner through-hole 395 of the lock cap 39. In this case, the second sealing ring 36 can prevent external moisture, dust, or the like from entering the lock cap 39 through a gap between the lock cap 39 and the main shaft 34 such that the optical fiber connector 3 can achieve a protection level of IP68, thereby improving reliability of the optical fiber connector 3.

Figure 16:
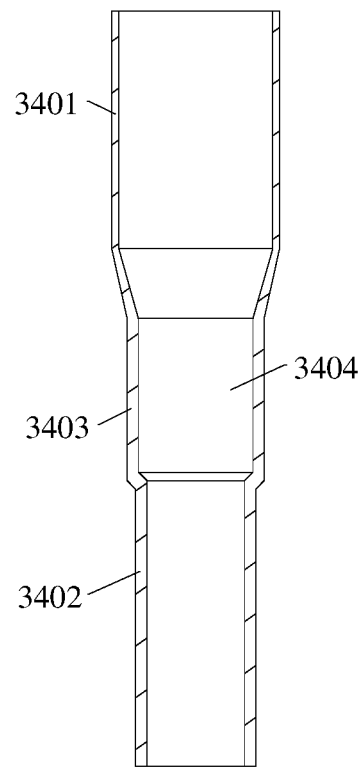
FIG. 16 is a schematic diagram of an internal structure of a sealing sleeve shown in FIG. 6.

Referring to FIG. 6, FIG. 12, and FIG. 16, FIG. 16 is a schematic diagram of an internal structure of the sealing sleeve 340 shown in FIG. 6.

One end 3401 of the sealing sleeve 340 of the optical fiber connector 3 is sleeved on an outer side of the tail end 342 of the main shaft 34 in a sealing manner. The other end 3402 of the sealing sleeve 340 is configured to allow insertion of the optical cable 2 and be connected to the optical cable 2 in a sealing manner. The sealing sleeve 340 is a hollow cylinder. The optical cable 2 is inserted into and passes through an inner through-hole of the sealing sleeve 340, and then enters the through hole 344 of the main shaft 34. The sealing sleeve 340 is configured to implement a sealed connection between the optical cable 2 and the main shaft 34, to improve reliability of the optical fiber connector 3 and extend a service life of the optical fiber connector 3.

The sealing sleeve 340 may be a heat shrink tubing. The sealing sleeve 340 may be a tube with adhesive on an inner surface, to improve reliability of connections to both the tail end 342 of the main shaft 34 and the optical cable 2. For the sealing sleeve 340, an inner diameter of the end 3401 (a top end in FIG. 16) connected to the tail end 342 of the main shaft 34 is greater than an inner diameter of the end 3402 (a bottom end in FIG. 16) connected to the optical cable 2. An inner diameter of a middle portion 3403 between the two ends (3401/3402) of the sealing sleeve 340 may be between the inner diameters of the two ends (3401/3402). An inner through-hole 3404 of the sealing sleeve 340 may be a hole with varying diameters. An outer sidewall of the sealing sleeve 340 is substantially step-shaped.

The sealing sleeve 340 is connected to a part of the metal portion 3422 and a part of the rubber portion 3421 in a sealing manner. In an embodiment, for the sealing sleeve 340, the end 3401 connected to the tail end 342 of the main shaft 34 is connected to both a part of the metal portion 3422 and a part of the rubber portion 3421 in a sealing manner. In this case, a connection relationship between the sealing sleeve 340 and the tail end 342 of the main shaft 34 is more stable and reliable.

Referring to FIG. 6 and FIG. 12, the optical cable 2 of the prefabricated optical fiber 20 may include the cable wire 21, an aramid yarn 22, a cable jacket 23, a first support ring 24, and a second support ring 25. Both the cable wire 21 and the aramid yarn 22 are located in the cable jacket 23. The aramid yarn 22 may be wrapped around the cable wire 21. Both tensile strength and bending strength of the aramid yarn 22 are greater than those of the cable wire 21. The aramid yarn 22 is configured to protect the cable wire 21, to reduce a risk of breaking the cable wire 21, and improve the tensile strength of the optical cable 2. The cable jacket 23 wraps the cable wire 21 and the aramid yarn 22, to provide protection.

The first support ring 24 is a metal ring. The first support ring 24 wraps around the cable wire 21 and the aramid yarn 22 and is located in the cable jacket 23. The second support ring 25 is a metal ring. The second support ring 25 wraps around the cable wire 21 and the aramid yarn 22 and is located in the cable jacket 23. The second support ring 25 and the first support ring 24 are disposed apart from each other. Both the second support ring 25 and the first support ring 24 provide support and protection.

Figure 17:
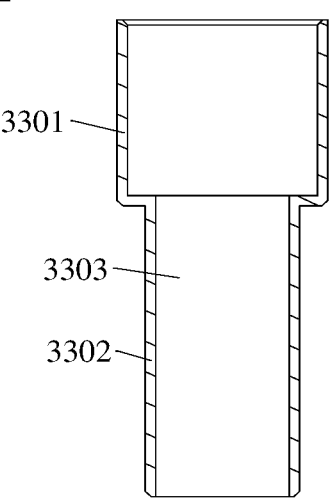
FIG. 17 is a schematic diagram of an internal structure of a metallic crimp ring shown in FIG. 6.

Referring to FIG. 6, FIG. 12, and FIG. 17, FIG. 17 is a schematic diagram of an internal structure of the metal crimp ring 330 shown in FIG. 6.

The metal crimp ring 330 of the optical fiber connector 31 is located in the sealing sleeve 340. The metal crimp ring 330 is a hollow cylinder. One end 3301 of the metal crimp ring 330 is sleeved on an outer side of the metal portion 3422 of the tail end 342 of the main shaft 34. The other end 3302 of the metal crimp ring 330 is configured to be sleeved on an outer side of the optical cable 2, and the end 3301 of the metal crimp ring 330 can firmly press the aramid yarn 22 of the optical cable 2 against the metal portion 3422.

In this embodiment, the metal crimp ring 330 firmly presses the aramid yarn 22 against the metal portion 3422, thereby improving connection strength between the optical cable 2 and the main shaft 34, and improving tensile strength of the optical fiber connector 3.

For the metal crimp ring 330, an inner diameter of the end 3301 (a top end in FIG. 17) connected to the metal portion 3422 is greater than an inner diameter of the other end 3302 (a bottom end in FIG. 17). An inner through-hole 3303 of the metal crimp ring 330 is a hole with varying diameters. An outer sidewall of the metal crimp ring 330 is step-shaped.

Figure 18:
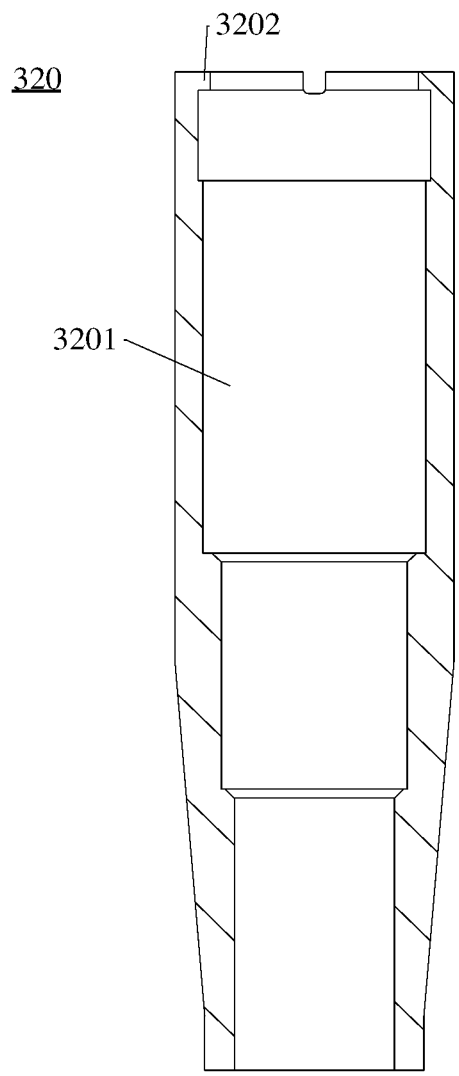
FIG. 18 is a schematic diagram of an internal structure of a tail ferrule shown in FIG. 6.

Referring to FIG. 6, FIG. 12, and FIG. 18, FIG. 18 is a schematic diagram of an internal structure of the tail ferrule 320 shown in FIG. 6.

The tail ferrule 320 is a hollow cylinder. The tail ferrule 320 is sleeved on the outer side of the tail end 342 of the main shaft 34 and an outer side of the sealing sleeve 340. The tail ferrule 320 is connected to the tail end 342 of the main shaft 34 in a sealing manner. The tail ferrule 320 is connected to the sealing sleeve 340 in a sealing manner. The tail ferrule 320 may be a formed sleeve member, and is sleeved on the outer side of the tail end 342 of the main shaft 34 and the outer side of the sealing sleeve 340 through assembly. Alternatively, the tail ferrule 320 may be directly formed on the outer side of the tail end 342 of the main shaft 34 and the outer side of the sealing sleeve 340 through decoration. In this embodiment, the tail ferrule 320 can provide protection and sealing effects, to improve tensile strength and sealing performance of the optical fiber connector 3.

A shape and a size of an inner through-hole 3201 of the tail ferrule 320 are adapted to the tail end 342 of the main shaft 34 and the sealing sleeve 340, and the tail ferrule 320 tightly wraps the tail end 342 of the main shaft 34 and the sealing sleeve 340.

An inner snap-fit flange 3202 is disposed on one end that is of the tail ferrule 320 and that is sleeved on the tail end 342 of the main shaft 34. The inner snap-fit flange 3202 extends into the inner through-hole 3201 of the tail ferrule 320.

Figure 19:
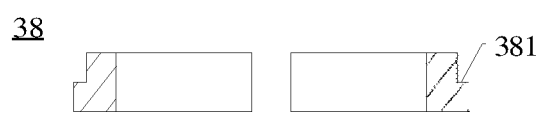
FIG. 19 is a schematic diagram of an internal structure of a snap ring shown in FIG. 6.

Referring to FIG. 6, FIG. 12, and FIG. 19, FIG. 19 is a schematic diagram of an internal structure of the snap ring 38 shown in FIG. 6.

The optical fiber connector 3 further includes the snap ring 38. The snap ring 38 is mounted in the limiting groove 3423 of the tail end 342 of the main shaft 34 (refer to FIG. 7). The snap ring 38 is fastened relative to the main shaft 34. An outer sidewall of the snap ring 38 forms a step-shaped structure. The outer sidewall of the snap ring 38 has a step-shaped surface 381. The step-shaped surface 381 faces the transition section 343 of the main shaft 34. The inner snap-fit flange 3202 of the tail ferrule 320 abuts against the step-shaped surface 381. In this case, the tail ferrule 320 may be further fastened relative to the main shaft 34 using the snap ring 38, to reduce a risk that the tail ferrule 320 accidentally detaches from the main shaft 34, thereby improving tensile strength of the optical fiber connector 3.

Figure 20:
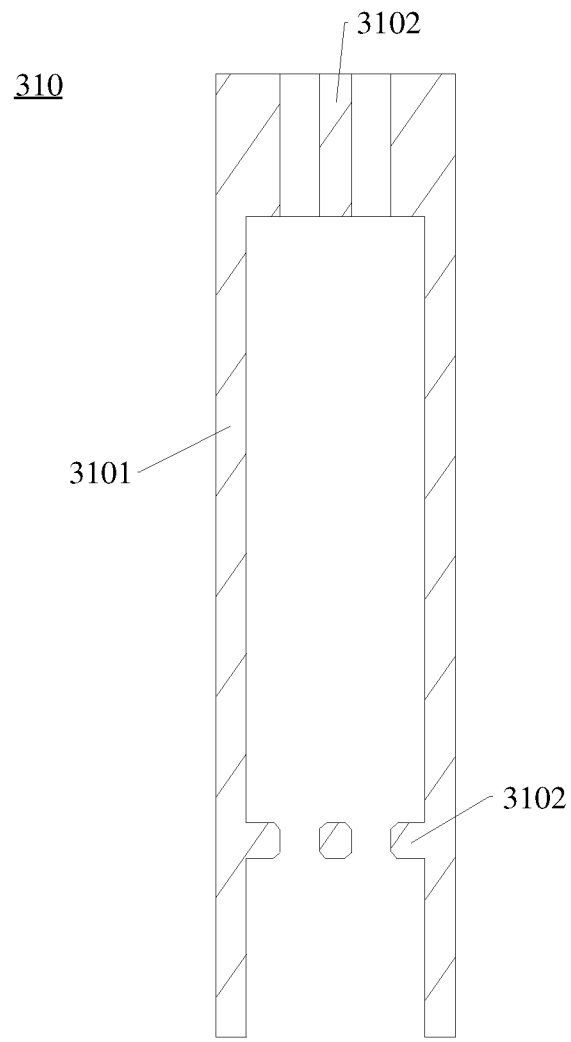
FIG. 20 is a schematic diagram of an internal structure of an adhesive container shown in FIG. 6.

Referring to FIG. 6, FIG. 12, and FIG. 20, FIG. 20 is a schematic diagram of an internal structure of the adhesive container 310 shown in FIG. 6.

The adhesive container 310 is located in the main shaft 34. The adhesive container 310 includes a body portion 3101 and at least two support portions 3102 fastened to an inner side of the body portion 3101. The at least two support portions 3102 are arranged apart from each other in an axial direction of the body portion 3101. The cable wire 21 of the optical cable 2 may extend into the body portion 3101, and be laid over or sequentially pass through the at least two support portions 3102. The adhesive container 310 is configured to support and fasten a part that is of the cable wire 21 and that is in the through hole 344 of the main shaft 34 such that the cable wire 21 is fastened relative to the main shaft 34, thereby protecting the cable wire 21 from damage due to frequent shaking or impact, and improving reliability of the optical fiber connector 3.

A third locating hole 3103 is disposed in the body portion 3101. A corresponding fourth locating hole 3104 (refer to FIG. 6) is disposed in the main shaft 34. The fourth locating hole 3104 is disposed in the transition section 343 of the main shaft 34. The adhesive container 310 may be fastened relative to the main shaft 34 by inserting a latch sequentially in the fourth locating hole 3104 of the main shaft 34 and the third locating hole 3103.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:
1. An optical fiber connector, comprising:
    a main shaft, comprising:
        a through hole;
        a head end; and
        a tail end coupled to the head end and away from the head end, wherein the through hole is disposed in the main shaft and extends from the head end to the tail end;
    a connecting piece fixedly coupled to the head end and partially accommodated in the through hole; and
    a lock cap comprising:
        a sealing portion rotationally coupled to an outer side of the head end; and a connection portion that is connected to a side of the sealing portion, wherein an outer diameter of the sealing portion is less than an outer diameter of the connection portion, wherein the connection portion is located on a side of the head end and is located away from the tail end, wherein the connection portion is configured to partially accommodate an adapter when the connecting piece is inserted into the adapter, wherein a lock protrusion is disposed on an inner side of the connection portion, wherein the lock protrusion is configured to be snap-fitted to a lock slot of the adapter when the lock cap is rotated by a first angle relative to the adapter, and wherein the first angle is less than or equal to 90 degrees.

2. The optical fiber connector of claim 1, wherein the main shaft further comprises:
 a transition section located between the head end and the tail end; and
 a first limiting surface facing the tail end and disposed on the transition section;
 wherein the lock cap further comprises:
  a limiting portion coupled to a side that is of the sealing portion and that is away from the connection portion; and
  a second limiting surface facing the sealing portion and disposed on the limiting portion;
 wherein the optical fiber connector further comprises an elastic part that is located between the transition section and the sealing portion, and wherein two ends of the elastic part abut against the first limiting surface and the second limiting surface respectively.

3. The optical fiber connector of claim 1, wherein the connecting piece comprises:
 a connection base with a first end and a second end, wherein the first end is inserted into the through hole; and
 a connection terminal fastened to the second end of the connection base.

4. The optical fiber connector of claim 3, wherein the connection terminal comprises:
 a protective housing comprising a top end face that is away from the connection base; and
 a ferrule mounted in the protective housing, wherein the ferrule comprises a second top end that is away from the connection base.

5. The optical fiber connector of claim 3, wherein the connection base comprises:
 a fastening portion comprising a side; and
 a mounting portion located on the side, wherein the mounting portion is partially inserted into the connection terminal, and wherein the fastening portion is integrally formed with the mounting portion.

6. The optical fiber connector of claim 5, wherein the connection terminal comprises:
 a protective housing, wherein the mounting portion is partially inserted into the protective housing;
 a ferrule mounted in the protective housing;
 a limiting hole disposed on the protective housing; and
 a limiting protrusion disposed on the mounting portion, and partially or completely clamped in the limiting hole.

7. The optical fiber connector of claim 6, wherein the protective housing comprises an inner surface, wherein the inner surface comprises a first locating surface facing the fastening portion, wherein the ferrule comprises an outer sidewall comprising a second locating surface facing away from the fastening portion, wherein the connecting piece further comprises an elastic connection part compressed between the ferrule and the mounting portion, and wherein an elastic force of the elastic connection part is configured to firmly press the second locating surface against the first locating surface.

8. The optical fiber connector of claim 1, wherein the optical fiber connector further comprises a first sealing ring that is located in the connection portion, and wherein the first sealing ring is configured to be compressed between the connection portion and the adapter.

9. The optical fiber connector of claim 1, wherein a sealing groove wraps around the through hole and is disposed on an outer circumferential side of the main shaft, wherein the optical fiber connector further comprises a second sealing ring, wherein the second sealing ring is compressed between a groove wall of the sealing groove and an inner side surface of the sealing portion, and wherein the sealing portion comprises the inner side surface.

10. The optical fiber connector of claim 1, further comprising a sealing sleeve, wherein the sealing sleeve comprises a first end and a second end, wherein the first end is sleeved on an outer side of the tail end in a sealing manner, and wherein the second end is configured to allow insertion of an optical cable and is configured to couple to the optical cable in a sealing manner.

11. The optical fiber connector of claim 10, wherein the tail end comprises:
 a rubber portion close to the head end; and
 a metal portion away from the head end and partially located in the rubber portion and fixedly connected to the rubber portion, wherein the sealing sleeve is connected to a part of the metal portion and a part of the rubber portion in a sealing manner.

12. The optical fiber connector of claim 11, wherein the optical fiber connector further comprises a metal crimp ring with two ends, wherein the metal crimp ring is located in the sealing sleeve, wherein one end of the two ends is sleeved on an outer side of the metal portion, wherein the other end of the two ends is configured to be sleeved on an outer side of the optical cable, and wherein the one end of the metal crimp ring is capable of firmly pressing an aramid yarn of the optical cable against the metal portion.

13. An adapter comprising:
 an adapter body comprising:
  an input end comprising an outer sidewall;
  an output end coupled to the input end and that is away from the input end;
  two penetration holes that extend from the input end to the output end and are disposed in the adapter body, wherein each of the penetration holes are configured to accommodate a part of a connecting piece of an optical fiber connector when the input end is inserted into a lock cap of the optical fiber connector; and
  a lock slot disposed on the outer sidewall, wherein the lock slot extends at a second angle in a circumferential direction of the input end, wherein the second angle is less than or equal to 90 degrees, and wherein the lock slot is configured to accommodate a lock protrusion on an inner side of the lock cap and be snap-fitted to the lock protrusion.

14. The adapter of claim 13, wherein the adapter further comprises:
 a protective cap comprising a protective lock protrusion disposed on an inner side of an end of the protective cap, wherein the end of the protective cap is capable of being sleeved on the outer sidewall of the input end, wherein the protective lock protrusion is snap-fitted to the lock slot; and a connection lanyard, wherein one end of the connection lanyard is sleeved on an outer side of the adapter body, wherein the other end of the connection lanyard is connected to the protective cap.

15. An optical fiber connection assembly, comprising:
an optical fiber connector comprising:
  a main shaft, comprising:
    a through hole;
    a head end;
    a tail end coupled to the head end and away from the head end, a connecting piece fixedly connected to the head end and partially accommodated in the through hole; and
  a lock cap comprising:
    a sealing portion rotationally coupled to an outer side of the head end; and
    a connection portion that is connected to a side of the sealing portion, wherein an outer diameter of the sealing portion is less than an outer diameter of the connection portion, wherein the connection portion is located on a side that is of the head end and that is away from the tail end, wherein a lock protrusion is disposed on an inner side of the connection portion; and
an adapter comprising a body, wherein the body comprises:
  an input end;
  an output end that is away from the input end;
  a penetration hole extending from the input end to the output end and is disposed in the adapter body; and
  a lock slot disposed on an outer sidewall of the input end, wherein the lock slot extends a second angle in a circumferential direction of the input end, wherein the second angle is less than or equal to 90 degrees, wherein the connection portion accommodates a part of the input end and the lock protrusion is located in the lock slot when the connecting piece is partially inserted into the penetration hole, wherein the lock protrusion is snap-fitted to the lock slot when the lock cap rotates by a first angle relative to the adapter body, and wherein the first angle is less than or equal to the second angle.

16. The optical fiber connection assembly of claim 15, wherein the main shaft further comprises:
  a transition section located between the head end and the tail end; and
  a first limiting surface facing the tail end is disposed on the transition section;
wherein the lock cap further comprises:
  a limiting portion connected to a side that is of the sealing portion that is away from the connection portion; and
  a second limiting surface facing the sealing portion and disposed on the limiting portion;
wherein the optical fiber connector further comprises an elastic part, wherein the elastic part is located between the transition section and the sealing portion, and wherein two ends of the elastic part abut against the first limiting surface and the second limiting surface respectively.

17. The optical fiber connection assembly of claim 15, wherein the connecting piece comprises:
  a connection base with a first end and a second end, wherein the first end is inserted into the through hole; and
  a connection terminal, wherein one end of the connection terminal is fastened to the second end of the connection base, and wherein another end of the connection terminal is inserted into the penetration hole.

18. The optical fiber connection assembly of claim 17, wherein the one or more connection terminals comprise:
  a protective housing comprising a top end face; and
  a ferrule mounted in the protective housing comprising a second top end face, wherein the top end face is away from the second top end face and away from the connection base.

19. The optical fiber connection assembly of claim 17, wherein the connection base comprises:
  a fastening portion comprising a side; and
  a mounting portion located on the side, wherein the mounting portion is partially inserted into the connection terminal, and wherein the fastening portion is integrally formed with the mounting portion.

20. The optical fiber connection assembly of claim 17, wherein the connection terminal comprises:
  a protective housing, wherein the mounting portion is partially inserted into the protective housing;
  a ferrule mounted in the protective housing;
  a limiting hole disposed on the protective housing; and
  a limiting protrusion disposed on the mounting portion, and partially or completely clamped in the limiting hole.

* * * * *